Dec. 26, 1933.  H. D. JAMES ET AL  1,940,867
CIRCUITOUS ELEVATOR
Filed May 31, 1930   8 Sheets-Sheet 3

INVENTORS.
Henry D. James
and Harold E. White.
BY
[signature]
ATTORNEY

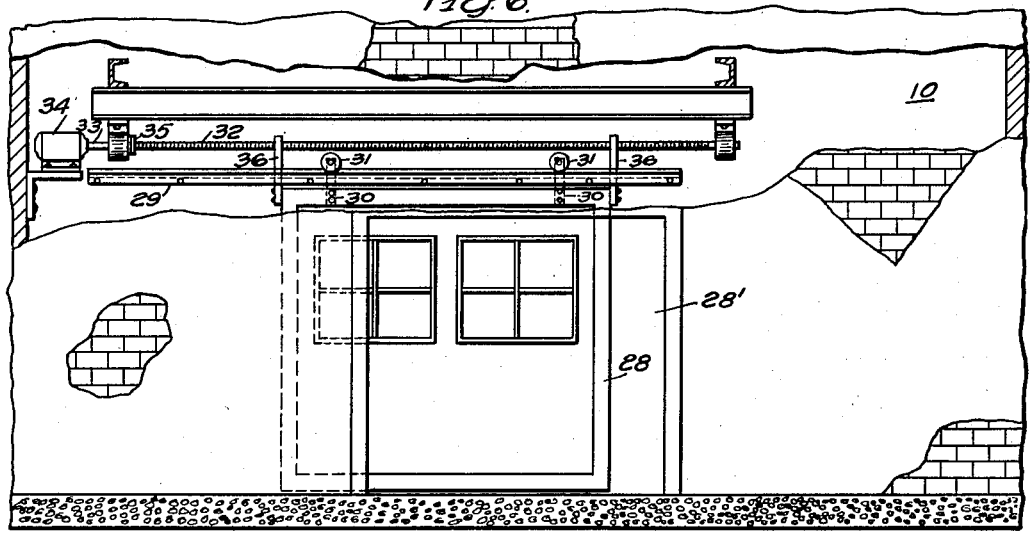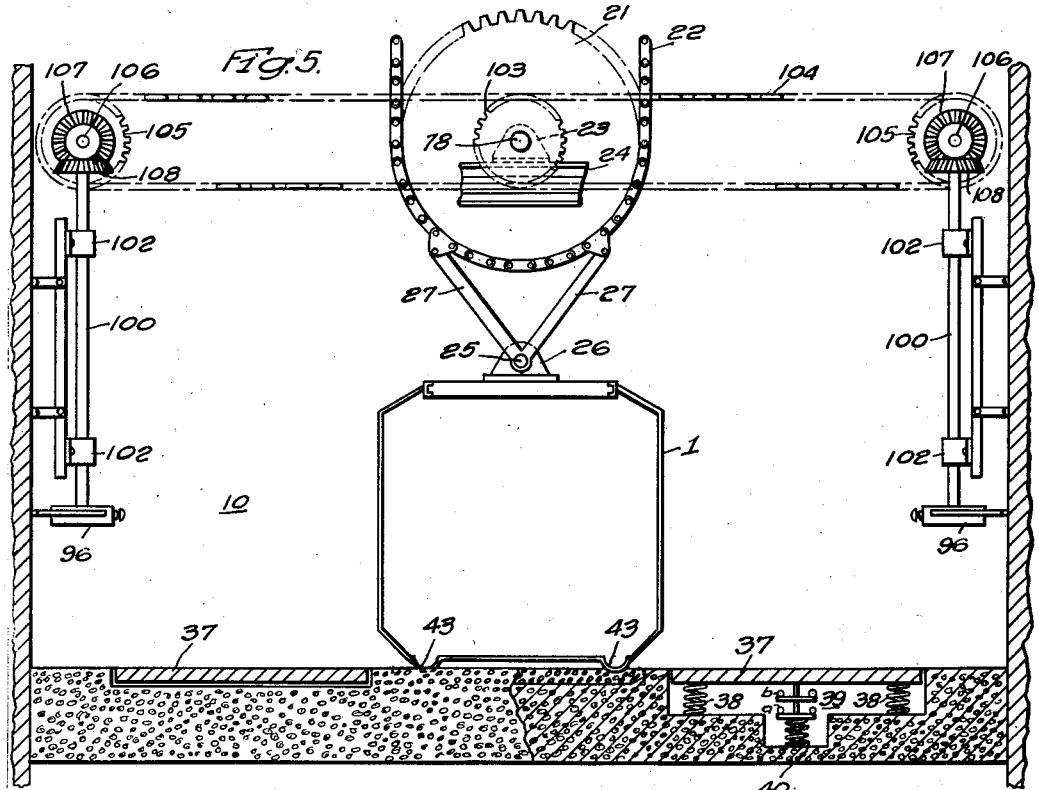

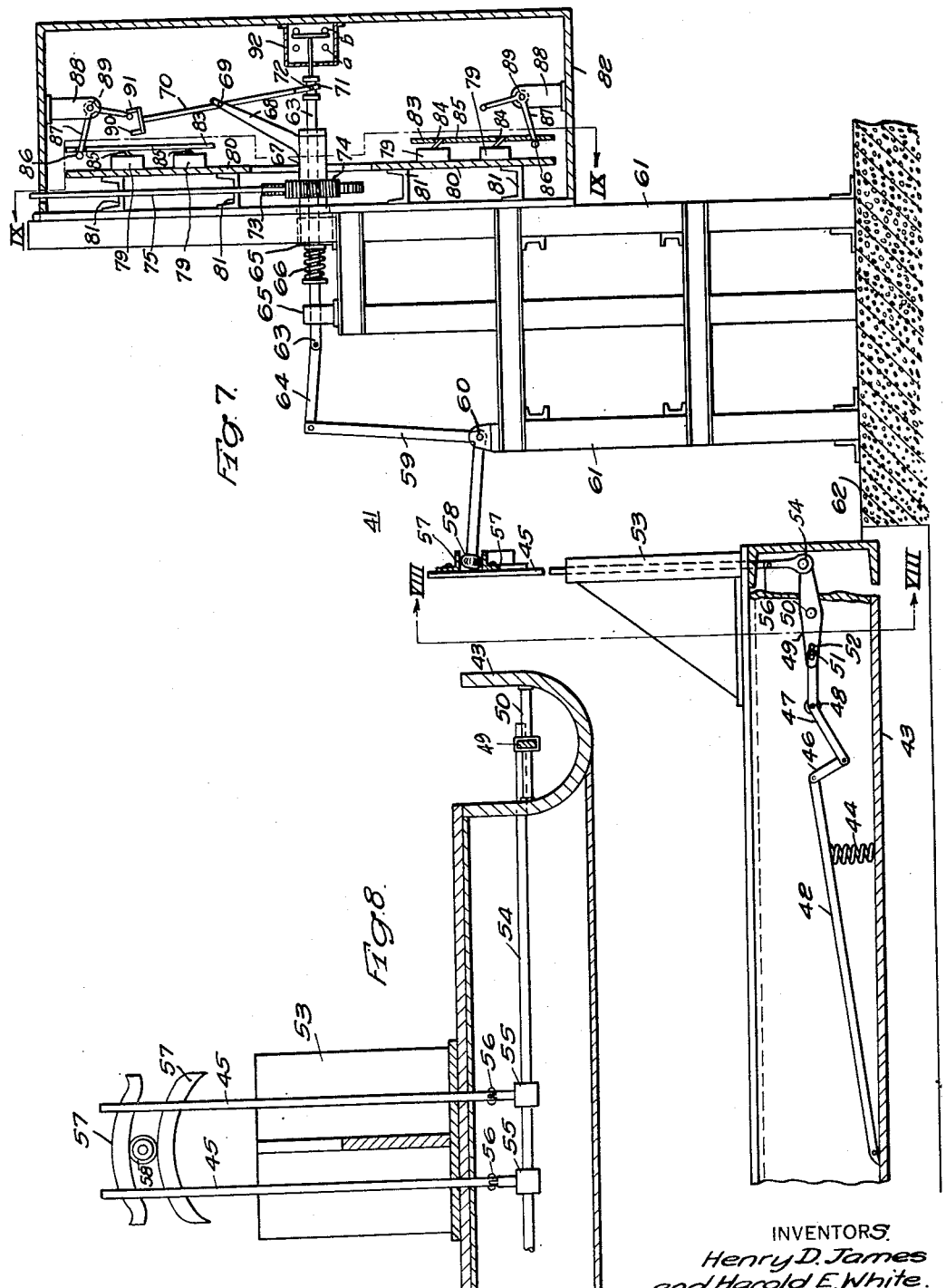

Dec. 26, 1933.    H. D. JAMES ET AL    1,940,867
CIRCUITOUS ELEVATOR
Filed May 31, 1930    8 Sheets-Sheet 6
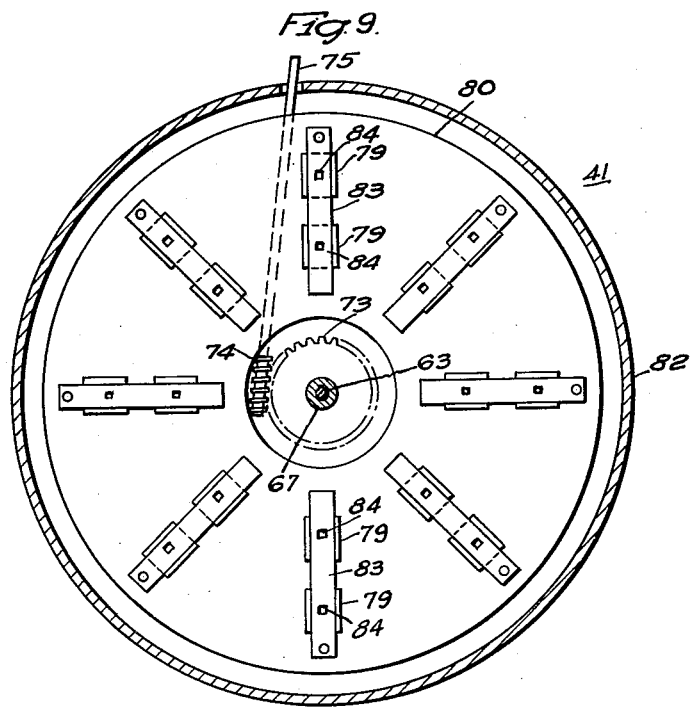
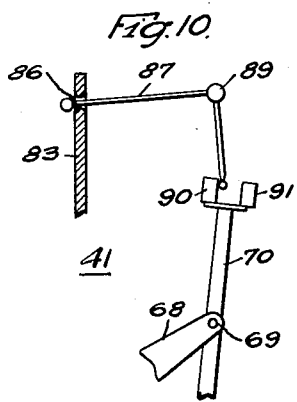
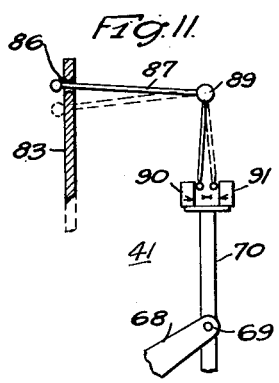
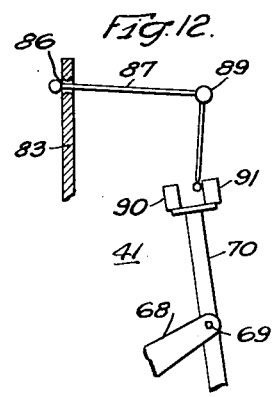
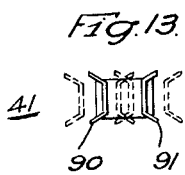
INVENTORS.
Henry D. James
and Harold E. White.
BY
ATTORNEY

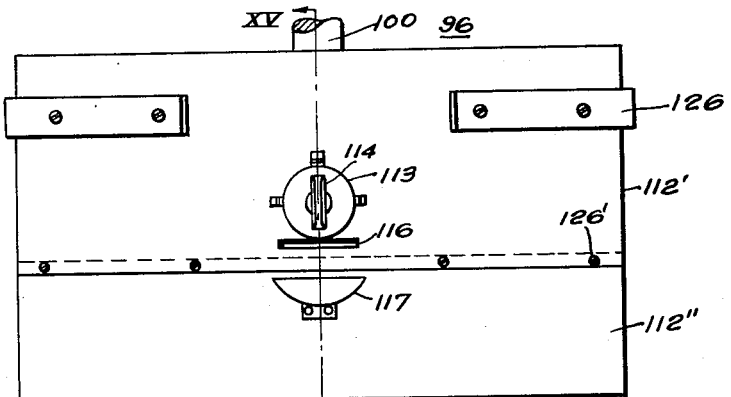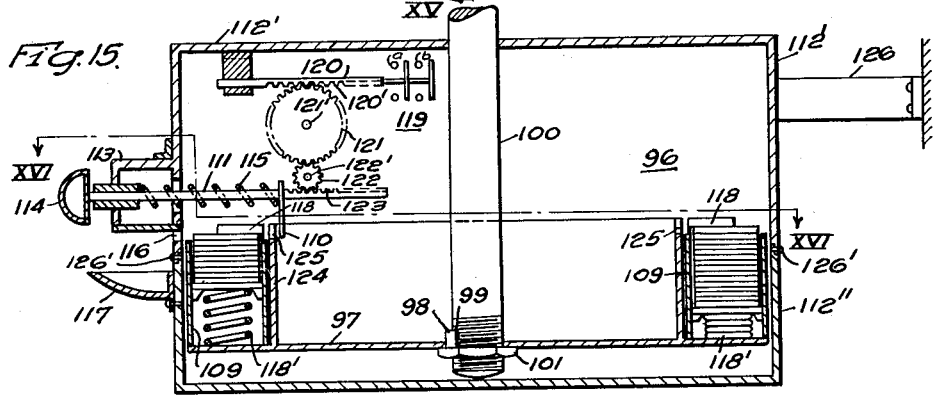

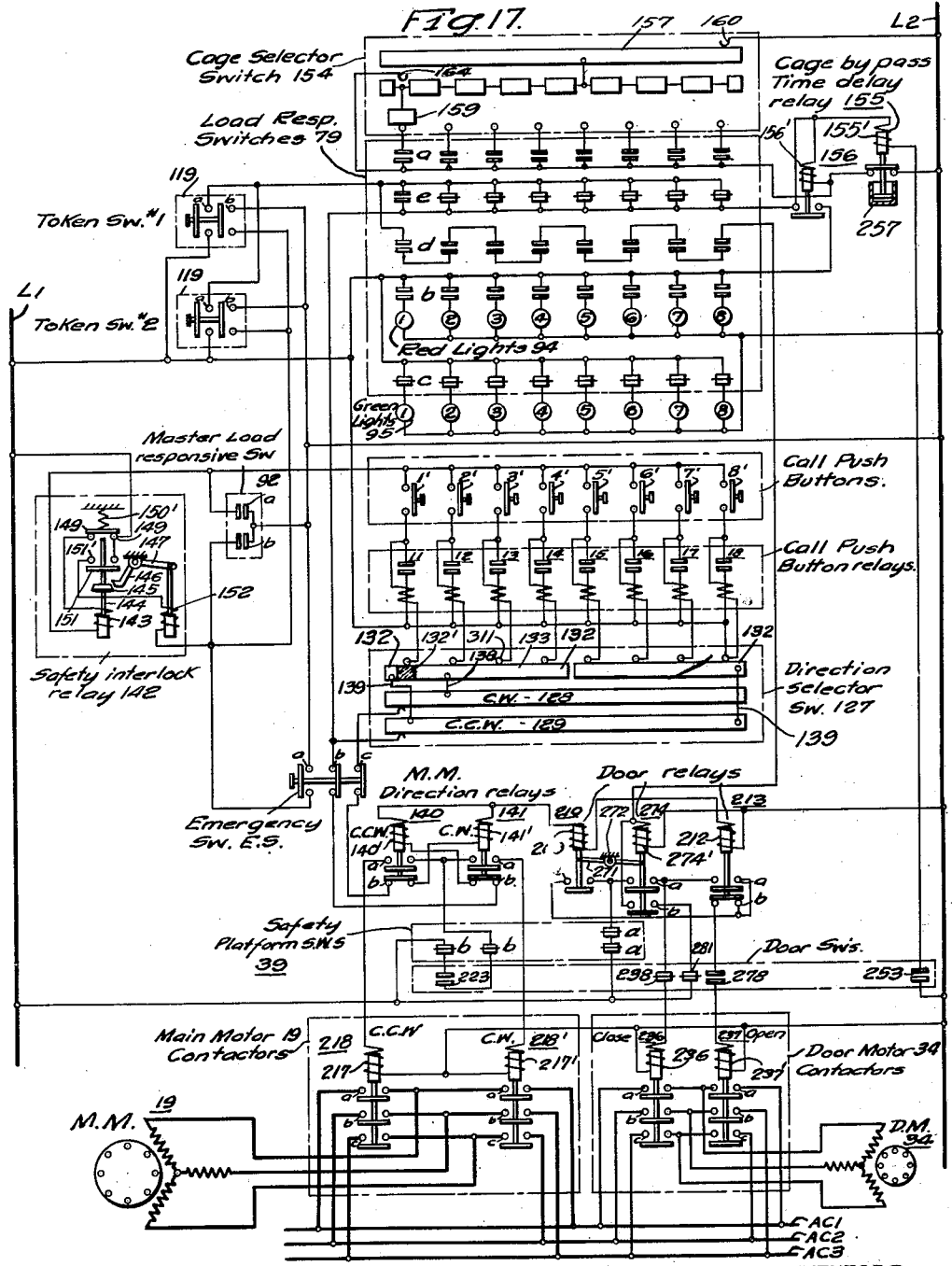

Patented Dec. 26, 1933

1,940,867

UNITED STATES PATENT OFFICE 1,940,867

CIRCUITOUS ELEVATOR

Henry D. James, Edgewood, and Harold E. White, Wilkinsburg, Pa., assignors to Westinghouse Electric and Manufacturing Company, a corporation of Pennsylvania Application May 31, 1930. Serial No. 458,110

38 Claims. (Cl. 187—16)

Our invention relates to circuitous elevators for the live storage or parking of automobiles and more particularly to an electrical control system therefor.

Circuitous elevators, that is, elevators comprising a plurality of load receptacles suitably supported in succession for circuitous movement through an orbital path have long been suggested as a means for storing or parking a great number of automobiles upon a relatively small ground area. Various systems for controlling the means for driving such elevators have been suggested, but all of the systems of control have contemplated a familiarity or training on the part of the operator with respect to the particular scheme of control in order to operate them, or at least the presence of a trained operator has been necessary in order to ensure the safe operation thereof.

Our invention provides a control system including various safety devices and features which make the presence of a trained operator unnecessary and by an automatic system of control allow the operation of the circuitous elevator by an inexperienced person, such as the average automobile driver, with complete safety.

Therefore, it is an object of our invention to provide a circuitous-type elevator for various applications, such as the storage or parking of automobiles, which has an automatically operable control system which obviates the necessity of special experience or training on the part of the operator.

Another object of our invention is to provide safety platform means inside the elevator structure to prevent the operation of the circuitous elevator when anyone is within the elevator structure and to prevent the closing of a door at the loading and unloading level as long as anyone is within the elevator structure.

Another object of our invention is to provide door operated interlocks to prevent the movement of the circuitous elevator until that door is completely closed and also to initiate the operation of a timing mechanism included in the control system, as well as to control the starting and stopping of the door motive means.

Another object of our invention is to provide a push button control system including a direction selector switch for automatically effecting the movement of a selected receptacle to the loading and unloading level by the shortest route.

Another object of our invention is to provide a manually operable means for obtaining a token or tag indicative of the cage or receptacle upon which a load, such as an automobile, has been stored the operation of which will automatically effect the closing of the door at the loading and unloading level, when the person operating it steps off the safety platform and out of the elevator building structure, and will subsequently effect the movement of the circuitous elevator to automatically bring a vacant cage to the loading and unloading level, stop it at a level therewith and open the door thereat.

Another object of our invention is to provide a safety interlock effective upon the operation of any push button, of the above-mentioned push button control system, or upon the entry of an automobile into an elevator cage, to prevent subsequent effective operation of all the push buttons until the token device has been operated or an automobile leaves a cage at the loading and unloading level.

Another object of our invention is to provide automatic dispatch control means, including a cage selector switch and time delay switch means used in conjunction with the token device for effecting movement of the circuitous elevator for a predetermined time after the closing of the door at the loading and unloading level, this time being sufficient to allow one or more cages to pass by the loading and unloading station whether loaded or not, whereby the load on the circuitous elevator may be distributed, and for effecting the continued movement of the circuitous elevator when a loaded cage reaches the loading and unloading level after the expiration of the predetermined time and the stopping thereof of the next vacant cage to reach the loading and unloading station after the expiration of the predetermined time.

Another object of our invention is to provide means responsive to the loaded or unloaded condition of a cage for actuating signal means indicative thereof.

Another object of our invention is to have said load responsive means effect the permanent closing of the door at the loading and unloading level after the last cage is loaded and the driver of the automobile leaves the elevator structure, to indicate the fact that all the cages are loaded and to effect the locking of the door against further operation thereof except upon the operation of the push buttons to call a loaded cage to the loading and unloading station.

Another object of our invention is to have said load responsive means operate to prevent the movement of the circuitous elevator by operation of the token device after the last cage has been loaded.

It is a further object of our invention to have said load responsive means used in conjunction with said cage selector switch for determining the continuance of movement or the stopping of the circuitous elevator, subsequent to the expiration of the predetermined time, depending upon whether the cage at the loading or unloading level is loaded or unloaded.

It is still another object of our invention to provide means on each cage responsive to the loaded or unloaded condition thereof associated with a selectively operable means having actuating means for engagement with said load responsive means of each cage when at the loading and unloading station and which is synchronously movable with the cages to engage switch means corresponding to the particular cage at the loading and unloading station.

Other objects of our invention will, in part, be obvious and will, in part, be made clear in the subsequent description of our invention, wherein Figs. 1 and 2, collectively, constitute a diagrammatic view in front elevation of a circuitous-type elevator and a control system for effecting the various objects of our invention.

Fig. 5 is a view on line V—V of Fig. 4 with a portion broken away which illustrates further the disposition of the safety platforms and the relative positions of the token devices with respect thereto as well as the method, in part, of the operation of the token devices. In this view the token devices are disproportionately enlarged for purposes of clarity.

Fig. 6 is a view in front elevation with a portion broken away, showing the doorway at the loading and unloading station, a door therefore and a method for its support and operation.

Fig. 7 is an enlarged view with parts in section showing the load responsive switch means and the method of its operation by treadle means on each cage.

Fig. 8 is a view taken on line VIII—VIII of Fig. 7, showing the lever mechanism, actuable in response to a movement of the treadle means, for engaging the arcuate members of the load-responsive device.

Fig. 9 is a view taken on line IX—IX of Fig. 7, illustrating the radial disposition of the switches corresponding to each cage and the driving means for rotating the switch operating arm in correspondence with the movement of the cages.

Fig. 10 is an enlarged view illustrating the position of the rotatable arm for operating the switches, with respect to the ball-crank levers when a loaded cage is at the loading and unloading station.

Fig. 11 is an enlarged view showing the position of the rotatable arm, with respect to the bell crank levers for operating the switches, when there is no cage at the loading and unloading station.

Fig. 12 is an enlarged view showing the position of the rotatable arm with respect to the bell crank levers for operating the switches, when an unloaded cage is at the loading and unloading station.

Fig. 13 is a view of the end of the rotatable arm corresponding to the position shown in Fig. 11 and relative positions thereof, shown by dotted lines, corresponding to positions shown in Figs. 10 and 12.

Fig. 14 is an enlarged view in front elevation of a token device.

Fig. 15 is a view taken on line XV—XV of Fig. 14 showing the internal structure of the token device.

Fig. 16 is a view taken on line XVI—XVI of Fig. 15, with the supporting brackets added and showing the internal structure of the token device, particularly the rotatable disc with stacks of tokens corresponding to particular cages disposed at regular intervals around the periphery.

Fig. 17 is a schematic diagram corresponding to the full line diagram illustrated in Figs. 1 and 2 as collectively used.

While our control system may be applied to circuitous elevators of various types of construction, we have illustrated it as applied to a preferred construction of a circuitous elevator such as illustrated and described in the copending application of H. D. James, Serial No. 330,455, assigned to the Westinghouse Electric & Manufacturing Company.

Figure 1:
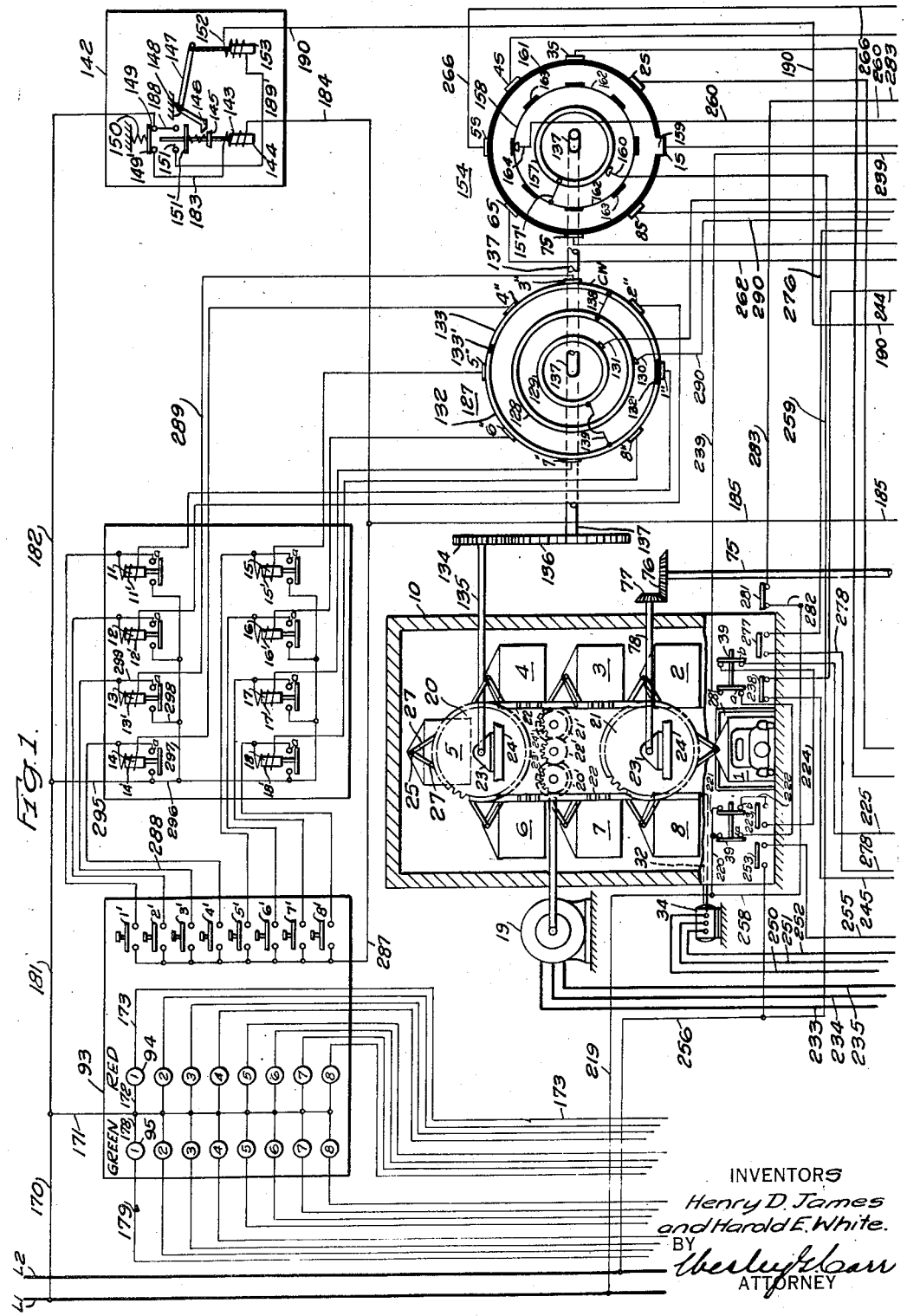

There is shown in Fig. 1 a building structure 10 having a door-way 28' at a loading and unloading station at the bottom of the structure past which a plurality of receptacles or cages numbered 1 to 8, inclusive, pass in succession. The building structure 10 may be devoted entirely to the storage of automobiles or other objects, or it may be a part of a structure devoted to other purposes, for example, an office building, a hotel, an apartment house, and the like.

The loading and unloading of each of the cages is preferably effected when it is in the bottommost position, since in this position it may be loaded or unloaded through the end thereof in a direction parallel to the longitudinal axis of support. However, other positions for loading and unloading the cages may very well be employed without departing in any way, from the principles of our invention.

Briefly, the structure of the circuitous elevator as illustrated in Fig. 1 comprises an upper pair of spaced-apart sprocket wheels or sheaves 20 and a similar pair of lower sprocket wheels or sheaves 21 having endless chains 22 connecting the corresponding and vertically aligned sprocket wheels of the upper and lower pairs. The sprocket wheels are suitably supported in the building structure 10, by means of shafts to which they are keyed, the shafts in turn supported in suitable bearing members 23 suitably supported from the building structure 10 as by structural members 24.

The cages are of suitable structural material and of a size and shape to accommodate the object for which the circuitous elevator is used and are suitably supported from the endless chains as by a trunnion bar 25 centrally disposed at the top of the cage, parallel to the longitudinal axis thereof, and retained to the cages fixedly or rotatably by the retaining or bearing members 26. One end of the trunnion bar or rod 25 of each cage is suitably attached to the endless chain 22 as by an over-hanging arm 27 and the opposite end of the trunnion bar 25 is similarly attached to the other endless chain at a corresponding level by a similar over-hanging arm 27. This over-hanging arm 27 may be rigid or flexible, as illustrated, that is, the arm comprises two relatively movable members comprising one or more integral parts, which serve to effect a gradual acceleration and deceleration in the speed of a cage as it transfers around the upper and lower pairs of sprocket wheels in moving from one vertical path of movement to the other.

The drive for the circuitous elevator may be through a motor connected to the shaft of either the upper or lower sprocket wheels. However, the preferred construction is as illustrated in Fig. 1 and comprises a gear mechanism 19', having the sprocket wheels 20' and 21' engaging opposite portions of the endless chain 22 and driven by motor 19 through pinion 22' and gears 23' and 24' engaging the pinion 22' and keyed to the shafts to which sprocket wheels 20' and 21' are respectively keyed.

Our invention provides for a motor operated door 28 (see Fig. 6) to open and close the doorway 28' at the loading and unloading station and controlled automatically by our control system which will be later described. The door 28 is suspended by means of bracket arms 30, attached to the top of the door, and rollers 31 from a Z-bar member 29 which serves as a track for the rollers 31. The opening and closing of door 28 is effected by rotation of the threaded rod 32 attached to the shaft 33 of the door motor 34 by the flange coupling 35. The bracket members 36, attached to the door 28 have threaded openings therein engaging the threaded rod 32, and are caused to travel therealong in either direction, depending upon the direction in which the rod is rotated, whereby the door is opened or closed.

It is one of the important functions of our invention to protect the operator from injury such as would occur were the circuitous elevator to move and strike him while he is still within the path of movement of the cages or as would occur if the door at the loading and unloading station closed before he had an opportunity to leave the hatchway space of the building structure.

To effect this protection for the operator, a pair of safety platforms 37 (see Figs. 4 and 5) are provided, one on each side of the bottommost position of a cage and together covering substantially all the floor space in the bottom of the elevator hatchway wherein a person might stand in the path of travel of the cages. A simple structure for these safety platforms is illustrated. The platform member 37, which is a rectangular member of suitable structural material, rests on compression springs 38 which are supported in turn on a sunken portion of the surrounding floor. A switch 39 is operable by a load on the platform member 37 such as a person standing thereon to open its normally closed contact members $a$ and $b$. A resilient means, such as a compression spring 40 returns the contact members $a$ and $b$ of the switch 39 to their normally closed position when the load is removed from the platform. The corresponding contact members $a$ and $b$ of the switches 39 of both safety platform members, are connected in series, the contact members $b$ being in the control circuit for the driving motor for moving the cages and the contact members $a$ being in the control circuit for effecting the operation of the door motor 34. Thus, when there is anyone upon either of the safety platforms, the door at the loading and unloading level cannot be closed and the cages themselves cannot be moved.

Our invention includes a device 41 which is responsive to the loaded and unloaded condition of a cage for effecting various operations of the control system. The structure of this device, its mode of operation, and functions are illustrated in Figs. 2, 3, 7, 8, 9, 10, 11, 12 and 13.

The load responsive device 41 comprises a cylindrical base 82 supported by a table structure 61 at the loading and unloading station adjacent the end of the cage in the bottom-most position and has a bell crank lever 59 engageable by a vertically movable rod 45 on each cage responsive to the loaded or unloaded condition of a cage.

The actuating mechanism for the member 45 comprises a treadle member 42 (Fig. 7) in each of the two trough-like trackways 43 of the cage, normally maintained in a raised position by a spring member 44, but depressible by the running of automobile wheels thereon to actuate the vertically disposed rod members 45 downwardly a certain distance through a link member 46, a bell crank member 47 which is pivotally retained to the sides of the trough-like track member 43 by means of a pin 48, and a lever 49 pivotally retained to the sides of the trough-like track member 43 by a pin 50. The lever 49 is moved by the bell crank member 47 by means of a pin 51 on the latter, which engages a groove or slot 52 in the end of the lever 49.

The vertically disposed rod members 45 are retained in a pedestal 53, having holes therethrough, in which the rods 45 reciprocate upon actuation by the treadle members 42. The levers 49 are pivotally attached to a horizontally disposed rod 54 in the end of the cage at right angles to the longitudinal axis of the troughs 43 and the vertically disposed rods 45 are pivotally attached to this rod member 54 at the joints 55 by a hinge coupling 56 (Fig. 8). Thus, when an automobile is properly positioned on a cage, the treadle members 42 are depressed, the pins 51 engaging the slots 52 of the lever members 49 are moved into a raised position and the rod member 54 is moved into a lowered position causing the vertical rod members 45 to move to a lowered position.

Attaced to the upper ends of the rod members 45 is a pair of arcuate angle bar members 57, having a contour which allows them to properly engage a ball 58 on the end of the bell crank lever 59 pivotally attached at a joint 60 to a supporting framework 61 resting on the floor 62 of the building structure, as a cage reaches the loading and unloading station. The upper end of bell crank lever 59 is attached to a horizontally disposed shaft member 63 of the load responsive means 41 by a connecting rod 64. The shaft 63 is slidably supported in bearing members 65 and is normally retained in a central position by a spring 66.

Rotatably mounted on the shaft 63 and inside of the casing 82 is a sleeve member 67 having a projecting arm 68 which serves as a pivotal support at a joint 69 for an arm 70 which is engaged by the end of the shaft 63 through bifurcated ends 71 retained in a groove on the shaft 63 by means of pins 72. Keyed to the sleeve member 67 is a worm wheel 73, which is engaged by a worm gear 74 keyed to the shaft 75, which is rotated in synchronism with the movement of the cages as by a means comprising a bevel gear 76 (see Fig. 3), keyed thereto engaging a similar bevel gear 77 which is keyed to a shaft 78 to which the lower sprocket wheels 21 are keyed.

Toggle switch members 79 (Fig. 9) are radially disposed at regular intervals upon a washer like member 80 which is fastened to the disc end of the cylindrical base 82 by bracket members 81, (Fig. 7). Any number of contact members may be provided for each switch 79, depending upon the number of functions it is desired to effect. Likewise, the angular spacing of the switches may be varied depending on the number of cages used. We have illustrated two switch units as comprising the members 79 provided for each cage, having altogether five contact members. That is, one of these switch units has three contact members $a$, $b$, and $c$, and the other, two contact members $d$ and $e$ (see Fig. 2).

A strap member 83, having slots 84 for engaging and operating the toggle members 85 of each switch is provided. One end of a bell crank lever 87, which is pivotally retained on the casing 82 by a supporting member 88 at the joint 89, engages each strap member 83 as by means of a ball-and-socket joint 86. The other end of the bell crank lever 87 is engaged by the forked end of the arm 70 between the two cam members 90 and 91. Thus, it will be seen that a horizontal movement of the shaft 63 is transmitted through the arm member 70, and the bell crank lever 87 to the strap member 83 and effects the operation of the toggle members 85 of the units of the switch members 79.

A switch 92, provided with contact members $a$ and $b$, is attached to the casing 82 of the load responsive device 41 to be actuated by movement of the shaft 63, the contacts $a$ and $b$ being open when the shaft 63 is in a neutral or central position, the contact members $a$ closing by movement of the shaft member 63 to the left of the neutral position and the contact members $b$ closing by movement of the member 63 to the right of the neutral position.

The operation of the load responsive device may be best understood by assuming a hypothetical case. It should be understood that, when no cage is at the loading level, the spring member 66 causes the shaft member 63 to move to a central or neutral position and, thus, for this condition, the member 70 is in a vertical position, as illustrated in the enlarged view of Fig. 11, and the bell crank lever 59 is moved so that the arm engaging the connecting rod 64 is in a vertical position and the arm engaging the arcuate members 57 on the rods 45 is in a horizontal position. It will be observed that the distance between the inside edges of the cam members 90 and 91 of the arm 70 is slightly greater than the distance from one end of the bell crank lever 87 in one position, to the corresponding end of the bell crank member 87 when in the other or dotted position.

Let it be assumed that a vacant cage comes to the loading and unloading level, then arcuate members 57 on the rods 45 engage the ball 58 on the bell crank 59, and since the rods 45 are in a raised position when the cage is vacant, the position of the arcuate members 57, with respect to the ball member 58, is such that the end of the bell crank 59 is raised when the cage is stopped at the proper level for loading and unloading. The raising of the end of the bell crank 59 causes a movement of the shaft 63 to the right, closing the contact members $b$ of the switch 92 and moving the bifurcated end 71 of the member 70 to the right pivotally about the joint 69. The arm 68 on the sleeve 67 has been rotated in synchronism with the movement of the cages so that the arm 70 is supported in a position where the cam members 90 and 91 engage the bell crank 87 for operating the units of the switches 79 corresponding to the particular cage at the loading and unloading level. The position of the arm 70, with respect to the bell crank 87, is shown clearly for the vacant condition of a cage, in Fig. 12.

Now let it be assumed that an automobile is driven into the cage. Then the treadle member 42 in each trough-like track member 43 is depressed and, as previously explained, this causes ball 58 on the end of the bell crank 59 to be moved downwardly and assume a position as in Fig. 3, which results in a movement of the shaft 63 to the left. This results in the closing of the contact members $a$ of switch 92 and causes the bifurcated end 71 of the arm 70 to be moved to the right about the pivotal joint 69 and the cam member 90 to engage the bell crank 87 and swing it through an arc to the right into a position as shown in the enlarged view of Fig. 10, thus effecting the operation of the contact members comprising switch member 79 from one position to the other.

It will thus be seen that the bell crank levers 87 are either in the one position in which the arm engaged by the cam members 90 and 91 is to the left of a vertical line through the pivotal joint 89, or the other position in which the arm is to the right of the center line.

When the cage leaves the loading and unloading station and the arcuate members 57 disengage the ball 58 on the bell crank 59, the shaft 63 returns to its neutral position, under the force exerted by the spring 66, thereby moving the arm 70 to a position where it rotates in a plane perpendicular to the axis of the shaft 63. The ratio of the bevel gears 77 and 76 and the worm gear 74 and worm wheel 73 is such, that when the next cage is at the exact level of the loading and unloading station, the arm 70 is in the proper position to have its cam members 90 and 91 engage the bell crank for operating the switches 79, corresponding with that particular cage.

A combination indicating lamp and call push button panel board 93 (Fig. 1) is provided at one side of the entrance doorway 28' at a height accessible to the driver when standing on the floor. It has two lights or two electric lamps for each cage, one 94 of a color, red for example, for indicating the loaded condition of a cage and the other 95 of another color, green for example, for indicating the vacant condition of a cage. The electric lamps 94 and 95 are connected across a source of supply through the contact members $b$ and $c$, respectively, of the switch member 79 corresponding to the cage they represent, in such manner as to be energized in accordance with the loaded or unloaded condition of the cage.

It is one of the objects of our invention to cause a driver of an automobile to procure a tag or token to serve as a memorandum check of the number of the cage upon which his automobile is stored. To do this, we have provided a token device 96 (refer to Figs. 14, 15 and 16) which must be operated before the door can be closed and the car-loaded cage be moved away from the loading station. This device comprises a disc-like member 97, removably attached to the threaded end of a shaft 100 by a nut 101 and properly positioned by means such as a key 98 and a keyway 99. The shaft 100 (see Fig. 5) is disposed in a vertical position and suitably supported for rotation in a pair of bearing members 102, which are attached to the building structure. In order that the shaft 100 may be rotated in synchronism with the rotation of the lower sprocket wheels 21, it is operatively connected thereto by means of a sprocket wheel 103 keyed to the shaft 78 to which the sprocket wheels 21 are keyed, an endless chain 104, engaging a similar sprocket wheel 105 keyed to a shaft 106 disposed parallel to the shaft 78, and a bevel gear wheel 107 keyed to the shaft 106, which engages a bevel gear wheel 108 that is keyed to the rod 100.

Figure 4:
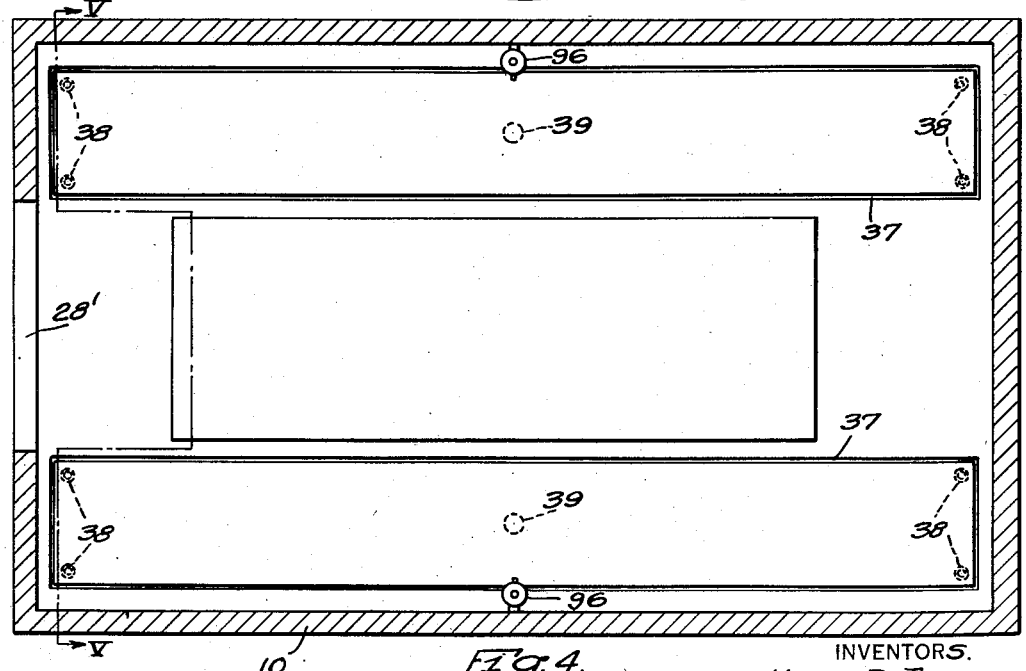
Fig. 4 is a diagrammatic plan view showing the position of the safety platforms with respect to the loading position of the cages and the disposition of the token devices with respect to the safety platforms.

Referring to Figs. 4 and 5, it will be seen that two such token devices are provided, one on each side of the hatchway, thereby providing a token device available to a driver regardless of the side of the automobile he steps from. Both token devices are similarly actuated from the driving shaft 78 as previously described.

Supported on the disc member 97 of the token device are a plurality of cylindrical members 109, one for each cage, in which stacks of tokens or tags may be disposed. Preferably, the tokens or tags are constructed of metal in the form of coins and those for each stack are stamped, engraved or printed with a number corresponding to the particular cage they represent. The stacks are disposed at regular intervals around the periphery of the disc member 97 so that the rotation of the disc by the operation of the elevator will cause the stack corresponding to the cage at the loading and unloading station, to move to a position in which the top token is engageable by a downwardly projecting finger 110, attached to a horizontally disposed rod 111 which projects through an opening in and is slidably retained to the upper part 112' of a cylindrical casing 112 by the bearing member 113 attached thereto. A handle member 114 is provided at the outside end of the rod 111, and disposed to be grasped by the operator and pulled outwardly against the force of a compression spring 115. A slot 116 is provided in the lower part 112'' of the casing 112 so that when the rod 111 is pulled outwardly, the top token of the stack engaged by the finger 110, passes through and drops into a cup-like support 117 attached to the lower portion 112'' beneath the slot 116. A spring member 118' in the bottom of each cylindrical stack-retaining member 109, forces the stack of tokens upwardly against the projecting members 118 on diametrically opposite sides of the top edge of the cylindrical members 109 and, thus, when the top token is removed, another is immediately pushed upwardly into its place.

A cylindrical member 124 supported on the disc member 97 concentrically therewith about the rod 100, has a plurality of slots 125 on the top edge thereof, one positioned opposite each stack to allow the finger 110 to move therethrough and engage the top token of the stack only when there is a cage at the loading and unloading station.

The upper portion 112' of the casing is attached to the building structure by bracket arms 126. The lower portion 112'' is fitted to the upper portion and detachably supported therefrom by a clamp, or as illustrated, by set screws 126' engaging alined tapped holes in the upper and lower portions.

Thus, the token device 96 is so constructed that the containers 109 may be readily refilled with tokens by removing the lower portion 112'', unscrewing the nut 101 from the rod 100, slidably removing the disc member 97 from the rod 100, inserting the tokens through the top of the members 109, and reassembling the parts.

The key 98 and keyway 99 insure the proper positioning of the disc 97 so that the stack of tokens corresponding to the cage at the loading and unloading station, may be accurately positioned with respect to the rod 100 upon replacing the disc 97 upon the rod.

A switch member 119 for effecting certain operations of the control system when the token device is operated, is attached to the upper portion 112' of the casing and provided with contact members $a$ and $b$ that are moved to a closed position by the rod 111 when the latter is pulled outwardly. The member 120, which actuates the contact members $a$ and $b$, is provided with rack teeth 120' that are engaged by a gear wheel 121 which is rotatably mounted on a pin 121' in the casing portion 112'. A pinion 122, which is rotatable on a pin 122', attached to the casing portion 112', is disposed between and engages the gear wheel 121 and a plurality of rack teeth 123 on the rod 111. Thus, a movement of the member 111 to the left will cause a corresponding movement of the switch actuating member 120 to the left.

As a part of our control system, we have provided a direction selector switch 127, illustrated diagrammatically in Fig. 1, for connecting certain circuits to effect the movement of a selected cage to the loading station by the shortest route. It is thought unnecessary to illustrate the construction of the selector switch in detail since a sufficient idea of its construction may be obtained from the general illustration. There are various modified structures possible to effect the results obtained by this selector switch. The preferred form of construction, however, comprises a drum upon which three conducting rings are peripherally disposed in insulated spaced relation to one another. Two of the rings 128 and 129 are continuous and engage brush members 130 and 131, respectively. The third ring comprises two semi-circular conducting segments 132 and 133 insulated from each other by the insulating segments 132' and 133'. Disposed at regular angular intervals and engaging the periphery of the third ring, comprising the segments 132 and 133, are brush members 1'' to 8'' which are connected in series, respectively, with the coils of the relays 11 to 18 and with push button switches 1' to 8', respectively, the latter constituting the call push buttons for calling the cages 1 to 8 to the loading and unloading station. The segment 132 is slightly longer than the segment 133 in order to effect the engagement of all of the brush members 1'' to 8'', except one with segment 132 or 133 when the switch is stationary. The insulating segment 132' is long enough to prevent a bridging of the segments 132 and 133 by any one of the brush members but the segment 133' may be shorter since its purpose is insulation of the segments 132 and 133 only, whereas the purpose of the insulating segment 132' is to effect the interruption of the control circuit through the selector switch.

The drum (not shown) upon which the three rings are mounted, is rotated synchronously with the movement of the cages as by a gear wheel 134 keyed to an extension of the shaft 135 of an upper sprocket wheel 20 and engaging a gear wheel 136 keyed to a shaft 137 to which the drum is fixedly retained.

The ring 128 is connected to the segment 133 by a conductor or conducting strap 138. The ring 129 is connected electrically to the segment 132 by the conductor or conducting strap 139.

The brush terminal 131 engaging the ring 129 is connected in series with a coil 140' of a relay 140 controlling one direction of movement of the driving motor 19 for moving the cages. The brush terminal member 130 engaging the ring 128 is connected in series with a coil 141' of a relay 141 controlling the opposite direction of movement of the driving motor 19. Therefore, the physical position of the drum of the direction selector switch 127 which is determined by the physical position of the cages determines the direction relay to be energized when one of the call push-button switches 1' to 8' is pressed so that the cage corresponding to the push-button switch operated moves to the loading and unloading station at the bottom of the building structure by the shortest route.

The basic principle and one form of construction of the direction selector switch 127 is described and illustrated in detail in the copending application of F. E. Lewis Serial No. 398,898, assigned to the Westinghouse Electric & Manufacturing Company.

In order to prevent the effective operation of any of the call push-buttons 1' to 8' after one of them has been operated to call a particular cage to the loading and unloading station, until that cage arrives and stops thereat, a safety interlock 142 is provided. This safety interlock comprises a relay coil 143 energizable upon the closing of any of the call push-buttons 1' to 8' to raise a plunger 144 having a catch member 145 thereon engageable by a latch member 146 on a bell crank lever 147 which is pivotally attached to a joint 148 on the supporting base of the interlock.

When the plunger 144 is raised sufficiently high to allow the catch member 145 to be above the latch 146, the upwardly projecting end of the plunger engages a contact member 149' on a switch 149 raising it against the force of a spring 150 and opening the circuit across the terminal members engaged by contact member 149'. The switch 149 is disposed in series with the relay coil 143 and the opening of this switch causes the deenergization of that coil allowing the plunger member 144 to drop back upon the latch member 146 which maintains it in a raised position, sufficiently high, however, to keep switch 149 open and to maintain a circuit through the resilient contact member 151' engaging the terminals of its corresponding switch 151. The latter switch is in series with a release coil 152 which is energizable upon the closing of the switch 119 of the token device 96 and upon the closing of contact members b of the switch 92 of the load responsive device 41 (which occurs when an automobile leaves the cage at the loading and unloading station) to cause a plunger member 153 attached to the arm of the bell crank lever 147 to rise and move the latch member 146 from beneath the catch member 145 thereby allowing the plunger 144 to be returned by gravity to its normal position. The release of the plunger 144 permits switch 149 to close and any of the call push-buttons 1' to 8' may then be effectively operated to call another cage to the loading and unloading station.

Another important part of our control system comprises a cage selector switch 154 (see Fig. 1) for causing vacant cages to be moved to the loading station in such manner that the loaded cages will be distributed evenly throughout the elevator. The switch 154 is employed in conjunction with a pair of dispatch relays 155 and 156 and the contact members a of the switch members 79 of the load responsive device 41, to effect a movement of the cages to bring the next vacant cage after one or more cages have passed the loading and unloading station to a stop thereat, after the operation of the switch 119 on the token device 96.

The cage selector switch 154 comprises a continuous conducting ring 157 and a conducting ring 158 connected by the conductor or conducting strap 157' and suitably mounted in spaced insulated relation to each other on the periphery of a drum driven in synchronism with the movement of the cages similarly to the direction selector switch 127, as by attachment to the shaft 137 to which the drum of the latter switch is attached. The ring 157 continuously engages the brush terminal 160. An insulating ring 161 is disposed around the ring 158 and is cut away at one point to permit a portion 159 of the ring 158 to project outwardly in line with the periphery of the ring 161. Disposed at regular intervals around the outer periphery of the ring 158 in such position as to engage the portion 159 or the insulating ring 161 are brush terminal members 1S to 8S, which are connected in series through the contact members a of the switch members 79—1 to 79—8 respectively, to the dispatch relays 155 and 156. The drum on which the rings 157 and 158 are mounted has such a physical relation to the position of the cages that the projecting portion 159 engages the one of the brush terminals 1S to 8S that corresponds to the cage at the loading and unloading station.

Disposed at regular intervals around the inner periphery of the ring 158 is a plurality of projecting segments 162 separated by insulating segments 163. A brush 164 is disposed to be engaged by the segments 162 and 163 as the ring 158 rotates, and its position is such that it will rest on an insulating segment 163 when a cage is at the level of or substantially at the level of the loading and unloading station and on a segment 162 when no cage is at the station.

Thus, after the operation of the switch 119 of the token device 96 and the drum of the cage selector has rotated a slight amount, the control circuit for the driving motor is maintained through brush member 160, the ring 157, conductor 157', ring 158, a segment 162 and brush member 164, during the portion of movement of the circuitous elevator when there is no cage substantially at the level of the loading and unloading station.

The length of the segment 159 and that of the segment 162 is such and they are so relatively positioned with respect to each other that the brush 164 engages a segment 162 just before one of the brushes 1S to 8S leaves the segment 159. Thus a continuous circuit is maintained through the switch to the dispatch relays 155 and 156.

The dispatch relays 155 and 156 are provided for the purpose of maintaining a movement of the cages after the actuation of the token device switch 119 and the closing of the door 28, for a predetermined length of time sufficient to allow one or more cages to move past the loading and unloading station, whether loaded or unloaded, and their function will be described in more detail later.

After the expiration of this predetermined length of time, if the next cage to reach the loading and unloading station is loaded, the control circuit for the driving motor is maintained through the brush member 160, ring 157, conductor 157', ring 158, segment 159, one of the brush members 1S to 8S corresponding to that particular cage, through the contact member $a$ of one of the switch members 79 corresponding to the particular cage, which contact member is closed when the cage is loaded. Thus, the cages continue to move until another cage is brought to the loading and unloading station, the contact member $a$ of which corresponding switch 79 is open, at which time the control circuit for the driving motor is opened and the cage stops at the loading and unloading station.

The operation of this cage selector switch 154 will be more clearly described in an assumed operation which will be subsequently given.

In order to describe other elements of our control system and to better explain the operation of the control system as a whole, let us assume several hypothetical instances.

Let it be assumed that a person drives an automobile up to the entrance doorway 28' with the intention to park or store his automobile upon the circuitous elevator. If the elevator is not in operation, the door 28 will be in a position opening the doorway 28'. If the elevator has previously been properly operated, there will be a vacant cage at the loading and unloading station. Let it be assumed in this instance that it is cage 1. The driver of the automobile can thus clearly observe that it is safe for him to drive immediately and directly upon the vacant cage, which he does.

When the leading wheels of the automobile reach the extreme end of the trough-like trackways 43, at which time the other end of the automobile will be completely upon the cage, the treadle members 42 in each trackway 43 are depressed by the running of the wheels of the automobile thereon and the load responsive device 41 is operated as previously described to cause the arm 70 thereof to move so as to operate the switch member 79—1, corresponding to cage 1 and thereby close its normally open contact members $a$, $b$, and $d$ and open its normally closed contact members $c$ and $e$. The closing of the contact members $b$ closes the energizing circuit through the red indicating lamp 94 corresponding to cage 1 to illuminate it.

The circuit is as follows: From line conductor L1, conductors 170, 171 and 172, indicating lamp 94 for cage 1, conductor 173, contact members $b$ of switch 79—1, conductor 174, ring conductor 175 and conductors 176 and 177 to line conductor L2.

The opening of contact members $c$ of the switch 79—1 opens the energizing circuit through the green indicating lamp 95 for the cage 1 and the light is thereupon extinguished. The circuit for the green lamp 95, just mentioned, is as follows: From line conductor L1, through conductors 170, 171 and 178, lamp 95 for cage 1, conductor 179, contact members $c$ of the switch 79—1, conductor 180, ring conductor 175 and conductors 176 and 177 to line L2.

The functions of contact members $a$, $d$ and $e$ will be explained later in connection with other features of our control system.

As will be recalled, the loading of a cage at the loading and unloading station causes contact members $a$ of the switch 92 on the load-responsive device 41 to close. The closing of these contact members effects the energization of coil 143 on the safety interlock 142, which results in the setting of the safety interlock to prevent further effective operation of the control system until the driver, together with all the occupants of the automobile have left the hatchway and the driver or some other person has operated one of the token devices 96.

The energizing circuit for the coil 143 is as follows: From line conductor L1, through conductors 170, 181 and 182, contact members 149' of the switch 149 on the safety interlock 142, conductor 183, coil 143, conductors 184 and 185, contact members $a$ of switch 92 on the load-responsive device 41, and conductors 186, 187, 176 and 177 to line conductor L2.

The energization of the coil 143 moves the plunger 144 upwardly thereby moving the catch member 145 thereon above the latch member 146 and opening the switch 149 and closing the switch 151. The opening of the switch 149 opens the energizing circuit through coil 143, but plunger 144 is retained in its raised position by the latch 146.

Inasmuch as the electrical supply line to the call push buttons 1' to 8' includes, the switch 149 in series therewith the opening of this switch upon the energization of the coil 143 interrupts the source of supply to the call buttons so that none of them can be effectively operated.

Let it be assumed that the driver has stepped out of his automobile upon either of the safety platforms 37. The next thing he does is to go over to the token device 96 on that side, grasp the handle 114, pull it outwardly and secure a coin or token with #1 thereon, which is ejected and deposited in the cup 117.

As previously described, the operation of the token device in this manner causes the switch 119 to be momentarily closed. The closing of contact members $b$ of switch 119 closes the energizing circuit through the release coil 152 on the safety interlock 142, which circuit extends from supply conductor L1 through conductors 170, 181, 182 and 188, contact members 151' of the switch 151 on the safety interlock 142, conductor 189, coil 152, conductors 190 and 191, through contact members $b$ of the two token device switches 119 in parallel, and conductor 177 to supply conductor L2.

The energization of the release coil 152 raises the plunger 153 and releases the latch member 146 which allows the plunger 144 to drop back to its normal low position, thus reclosing the switch 149 and opening the switch 151. The opening of the latter switch opens the energizing circuit to coil 152 and the latch member 146 is restored to its normal position. The reclosing of the switch 149 re-establishes the electrical connections to the call push button switches 1' to 8' allowing them to be subsequently operated effectively.

The closing of contact members $a$ of the switch 119 of the token device closes a circuit for energizing the coil 156' of the dispatch relay 156, which circuit extends from supply conductor L1 through conductor 192, contact members $a$ of the switch 119 and conductor 193 to the junction point 194 (or by a parallel circuit through the contact members $a$ of the other switch 119 to the same point 194, if the other token device is operated), conductors 195 and 196, ring conductor 197 through all of the closed contact members $e$ of the switch members 79 in parallel to the ring conductor 198, thence by conductors 199, 200 and 201, coil 156' of the relay 156, conductor 202, normally closed contact members $a$ of the relay 155, and conductor 203, to supply conductor L2.

The energization of coil 156' closes the normally open contact members $a$ of relay 156, which establish a holding circuit to the coil 156' from supply conductor L1, shunting the portion of the circuit just described to that point. The shunting circuit extends from supply conductor L1, through conductor 204, contact members $a$ of relay 156, and conductor 205, to the coil 156'. The switch 119 may thus close but momentarily.

The closing of the contact members $a$ of relay 156 also completes a circuit for energizing the relay 210, the relay 213 and also the counterclockwise direction relay 140, which circuit extends from supply conductor L1, through conductor 204, contact members $a$ of relay 156, conductors 205, 201, 200 and 206, normally closed contact members $b$ of the emergency stop switch ES, conductor 206', normally closed contact members $b$ of the clockwise direction relay 141, conductor 207, coil 140' of the counter-clockwise direction relay 140, conductor 208, coil 209 of the relay 210, conductor 211, coil 212 of the relay 213, and conductors 214, 215 and 216 to supply conductor L2.

The energization of the relay 210 closes its normally open contact members $a$.

The energization of the relay 213 closes its normally open contact members $a$ and opens its normally closed contact members $b$. The closing of the contact members $a$ of the relay 210 and the contact members $a$ of the relay 213 partially completes a circuit for energizing the door closing relay 236.

The energization of the relay 140 causes its normally open contact members $a$ to close and its normally closed contact members $b$ to open.

The closing of the contact members $a$ of relay 140 partially prepares a circuit for energizing the coil 217 of a driving motor relay 218 which controls the supply of energy to the three-phase driving motor 19 for a direction of rotation thereof to secure a counter-clockwise movement of the elevator.

Assuming now that the driver and his companions step off of the safety platforms and leave the elevator, then the contact members $a$ and $b$ of the safety platform switches 39 close, thereby effecting the closing of the door and subsequently operating the elevator to move the cages to bring an unloaded cage to the station.

The closing of the contact members $b$ of the switches 39 closes two more gaps in the partially prepared circuit for energizing the coil 217 of the driving motor relay 218.

The closing of the contact members $a$ on the switches 39 completes a circuit for energizing the door closing relay 236 to close the door 28, which circuit extends from supply conductor L1 through conductors 219 and 220, contact members $a$ of the two safety platform switches 39 in series, conductor 239, conductor 240, the contact members $a$ of the relay 210, conductors 241 and 242, contact members $a$ of the relay 213, conductors 243 and 244, door-operated switch 238, (closed when door is open), conductor 245, coil 236' of the relay 236 and conductors 246 and 216 to line conductor L2.

The energization of the relay 236 completes a circuit for energizing the door closing motor 34 which circuit extends from the three-phase supply conductors AC1, AC2 and AC3, through conductors 247, 248 and 249 connected respectively thereto, contact members $a$, $b$ and $c$ of relay 236, and conductors 250, 251 and 252, respectively, to the terminals of the three-phase door motor 34.

The energization of the motor 34 closes the door 28, which, when completely closed, causes the opening of switch 238, to thereby deenergize the relay coil 236' and bring the door motor 34 to rest.

The closing of the door also operates the switch 223 which completes a circuit for energizing the coil 217 of the driving motor direction relay 218, which circuit extends from line conductor L1, through conductors 219, 220 and 221, contact members $b$ of safety platform switch 39, conductor 222, door-operated switch 223, which is closed only when the door 28 completely closes the entrance doorway 19, conductor 224, contact members $b$ of the other safety platform switch 39, conductors 225 and 226, contact members $a$ of the direction relay 140, conductor 227, coil 217 of the relay 218, conductors 228, 229 and 216 to line conductor L2. The energization of the direction relay 218, causes the contact members $a$, $b$ and $c$ of that relay to connect the three-phase supply lines AC1, AC2, and AC3 to the driving motor 19 through conductors 230, 231 and 232 connected respectively thereto, and through conductors 233, 234, and 235 connected to the motor 19, and the circuitous elevator is driven in a counter-clockwise direction.

Therefore it will be seen that when the driver and all other persons have left the hatchway, the closing of the contact members $a$ on the two safety platform switches 39 causes the door to close and the elevator driving motor to start moving the loaded cage away from the loading and unloading station.

The circuitous elevator continues to move for a predetermined length of time sufficient to allow one or more cages to pass the loading and unloading station, regardless of whether they are loaded or unloaded and s'ops only when the next vacant cage thereafter reaches the loading and unloading station, at which time it stops with the vacant cage correctly aligned with the level of the loading and unloading station. This is effected as follows:

The complete closing of the door 28 closes the door-operated switch 253, which closes the energizing circuit through coil 155' of the time-delay relay 155 as follows: From line conductor L1, through conductor 204, contact members $a$ of the relay 156, conductors 205 and 254, coil 155', conductor 255, switch 253, and conductor 256 to line conductor L2. The contact members $a$ of the relay 155 are opened after a predetermined length of time, determined by the setting of the dash pot 257.

The opening of the contact members $a$ of the relay 155 would open the energizing circuit through coil 156' of the relay 156, but the circuit is maintained through that coil by means of the cage selector switch 154 and the contact members $a$ of the load-responsive switch members 79 as follows:

Assume that the contact members $a$ of the relay 155 open when no cage is at the loading or unloading station. At this time it will be recalled, as previously explained, the brush member 164 is in engagement with a segment 162 on the ring 158 of the cage selector switch 154 and the energizing circuit through coil 156' is maintained through the following circuit: From supply conductor L1, through conductor 204, contact members $a$ of relay 156, conductor 205, coil 156', conductors 261 and 260, brush 164, segment 162, ring 158, conductor 157', ring 157, brush 160, and conductors 259 and 256 to supply conductor L2.

Now let it be assumed that the next cage, for example, #6, to reach the loading and unloading station has an automobile thereon. In this position of the circuitous elevator, the brush member 164 engages an insulating segment 163 on the ring 158 and the energizing circuit for relay 156 would be opened if the cage were empty, but the energizing circuit is maintained therethrough by means of contact members $a$ of the load-responsive switch 79 corresponding to that cage. This circuit is as follows: From supply conductor L1 through coil 156', as previously traced, thence through conductors 261 and 265, ring conductor 264, conductor 263, contact members $a$ of the load-responsive switch 79—6, which are in a closed position when the cage is loaded, brush 6S, segment 159, and thence through rings 157 and 158 to supply conductor L2, as previously traced.

Thus the circuitous elevator continues to move until the brush terminal member 159 engages one of the brush terminal members S connected in series with contact members $a$ of one of the load-responsive switches 79, corresponding to an unloaded cage. Although the segment 159 leaves one of the brush terminal members 1S to 8S in its rotation, it maintains contact therewith until the brush terminal member 164 has again run upon or engaged a segment 162. Thus the energizing circuit through the coil 156' is maintained continuously until the segment 159 engages one of the brush terminal members 1S to 8S corresponding to an unloaded cage, as previously mentioned.

Let us assume that cage 5 is unoccupied and is next to reach the loading and unloading station. Just before brush terminal member 164 is disengaged from a conducting segment 162, segment 159 engages the brush 5S, associated with load switch 79—5. Since cage 5 is unoccupied, however, contact members $a$ of switch 79—5 are open. Accordingly, when brush 164 is disengaged from a conducting segment 162, the circuit for coil 156' is interrupted, and relay 156 resumes the illustrative position.

The opening of relay 156 interrupts the energizing circuit for relays 140, 210 and 213, all of which consequently reassume the illustrated positions.

The opening contact members $a$ of the relay 140 results in the deenergization of the relay coil 217 and the immediate stopping of the driving motor 19.

We have not illustrated any braking means for the driving motor 19. However, it should be understood that we have omitted this in order to simplify the control circuit. Any of the usual braking control schemes may be applied to our invention, for example, a system comprising a brake such as used in well known motor control systems normally spring-operated to set on a drum keyed to the shaft of the driving motor, the brake having a magnet coil energizable upon the closing of normally open contact members on both of the direction relays 218 and 218" to release the brake and deenergizable upon the opening of the contact members, to effect the immediate setting of the brakes.

Although the coil 209 of relay 210 is deenergized, the contact members $a$ of relay 210 do not open, since the plunger rod 270 which moves a contact member $a$ of the relay 210 is pivotally mounted on one end of the lever 271, which rocks about the fulcrum 272 mounted upon a supporting base, the opposite end of the lever 271 being pivotally attached to the plunger rod 273 of a relay 274. The moment about the fulcrum point 272 exerted by the plunger 270 is equal to the moment exerted by the plunger 273, and, therefore, even though the relay coil 209 is deenergized, the contact members $a$ of the relay 210 remain closed because the lever system is in a balanced condition regardless of the position in which it is placed.

Upon the deenergization of the coil 212 of relay 213, the contact members $a$ of the relay 213 open and the contact members $b$ of the relay 213 close. A circuit is thus established through contact members $b$ of relay 213 and contact members $a$ of relay 210, which closes an energizing circuit through the door opening relay coil 237'. This circuit is as follows: From supply conductor L1, through conductors 219 and 220, contact members $a$ of the two safety platform switches 39 in series, conductors 239 and 240, contact members $a$ of the relay 210, conductors 241 and 275, contact members $b$ of the relay 213, conductor 276, door-operated switch 277, which is opened only when the door 28 is completely open, conductor 278, coil 237' of the door opening relay 237, and conductors 246 and 216 to supply conductor L2.

The energization of the coil 237' closes the normally open contact members $a$, $b$ and $c$ of the relay 237, which connect the three-phase alternating current supply lines AC1, AC3 and AC2, respectively, to the conductors 250, 251 and 252, thereby effecting a reversal of rotation of the door motor 34 as compared to the direction of rotation thereof when actuated by the door closing relay 236.

The door 28 is thus moved to a completely opened position and in that position it opens the switch 277 thus causing the deenergization of the relay coil 237' and the immediate stopping of the door motor 34.

There is now the vacant cage 5, as assumed, at the loading and unloading station, the doorway 28' is entirely open and it will be obvious that any subsequent driver of an automobile who desires to park or store his automobile on the circuitous elevator will repeat the cycle of operations just previously described.

Now let it be assumed that the driver of an automobile has driven his automobile upon the last vacant cage and that each of the cages of the circuitous elevator contains an automobile. Upon the operation of the token device by the driver, or other person, the energizing circuit for the door-closing relay coil 236' is immediately set up, in series, through all the contact members $d$ of the load-responsive switch members 79, and the door 28 is immediately closed upon the driver stepping off the safety platform 37. Also further movement of the circuitous elevator is prevented because the control circuit including contact members $a$ of the token device twitches 119, previously traced, is opened, due to the fact that all of the contact members $e$ of the load-responsive switches 79, which are in parallel, are in an open position when all of the cages are loaded. Therefore, under these conditions, the closing of the contact members $a$ of the token device switches 119 effects no movement of the circuitous elevator.

The operation for the door closing relay 236, in this instance, is effected as follows: From supply conductor L1, through contact members $a$ of the particular token device switch 119, which the driver has operated, to the junction point 194, conductor 195, all of the contact members $d$ of the load responsive switches 79 in series, (these switches now all being in a closed position) conductor 279, coil 274' of the relay 274, and conductors 280, 215 and 216 to supply conductor L2.

The energization of the coil 274' closes the normally open contact members $a$ and $b$ of the relay 274 and through the lever 271 causes the opening of the contact members $a$ of the relay 210.

The closing of the contact members $b$ of the relay 274 establishes a holding circuit which maintains the relay coil 274' energized until the door 28 is completely closed, at which time the holding circuit is interrupted by the opening of the door-operated switch 281, which opens when the door is completely closed. The holding circuit through contact members $b$ is as follows: From supply conductor L1, through conductors 219, 258 and 282, door switch 281, conductor 283, contact members $b$ of the relay 274, conductor 284, coil 274' and conductors 280, 215 and 216 to supply conductor L2.

The closing of the contact members $a$ of the relay 274 closes the energizing circuit through the door closing relay coil 236'. This circuit is as follows: From supply conductor L1, through conductors 219, 220, contact members $a$ of the two safety platform switches 39 in series, conductors 239 and 285, contact members $a$ of the relay 274, conductors 286 and 244, the door switch 238 (which opens only when the door is completely closed), conductor 245, coil 236' and conductors 246 and 216 to supply conductor L2. The contact members $a$, $b$ and $c$ of the relay 236 are thus closed and connect the three-phase supply conductors AC1, AC2 and AC3 to the door motor 34 to effect the closing of the door. When the door is completely closed, the switch 238 opens, causing the deenergization of the relay coil 236' and the subsequent stopping of the motor 34.

Thus, the door 28, when closed under these conditions, serves as a signal device to indicate to persons approaching the doorway 28 that the circuitous elevator has all its cages loaded. In addition, of course, to the indication of the closed door there is the indication on the indicating lamp panel of red lamps 94 all of which are illuminated by this condition of the circuitous elevator and that of the green lamps which are all simultaneously dark. Obviously a master indicating lamp which is illuminable upon the closing of all the contact members $d$ of the switches 79, can be used in addition, if desired.

Now let it be assumed that the driver of an automobile who has parked or stored his automobile in the circuitous elevator returns to procure it. Obviously the closed door will not affect the operation of the proper call push button corresponding to the cage upon which his automobile is stored. Of course, the door 28 may be closed, due to the fact that the circuitous elevator is moving and in that case, if the driver does close a call push button, let us say call push button 3' corresponding to cage 3, the safety interlock 142 prevents the closing thereof being effective in the manner previously described.

However, let it be assumed that the circuitous elevator is not moving, that the cages are occupying positions as illustrated in Fig. 1, and that no other person is attempting to operate the elevator or attempting to drive an automobile upon a cage or to drive an automobile off a cage. For this set of circumstances, the closing of the call push button switch 3' will be effective to cause cage 3 to move in a clock-wise direction to the loading and unloading station because such direction is the shortest route thereto, and stop thereat. The circuit closed by the operation of the call push button 3' is as follows: From supply conductor L1, through conductors 170, 181 and 182, the switch 149 of the safety interlock 142, conductor 183, coil 143, conductors 184 and 287, call push button 3', conductor 288, coil 13' of the relay 13, conductor 289, brush terminal member 3'', clockwise segment 133 of the direction selector switch 127, conductor 138, ring 128, brush 130, conductor 290, normally closed contact members $c$ of the emergency switch ES, conductor 291, normally closed contact members $b$ of the counter-clockwise direction relay 140, conductor 292, coil 141' of the clockwise direction relay 141, conductor 208, coil 209 of the relay 210, conductor 211, coil 212 of the relay 213, and conductors 214, 215 and 216 to supply conductor L2.

A holding circuit through contact members $a$ of the relay 13 is closed when that relay is energized which allows the call push button 3' to be released and the circuit maintained from supply conductor L1 through conductors 170, 181 and 295, 296, 297 and 298, contact members $a$ of the relay 13, conductor 299 to coil 13' and thence as previously traced to the conductor L2. The closing of the call push button 3', it will be understood from the circuit therethrough as just previously traced, effects the operation of the safety interlock 142 by the energization of coil 143 and thus subsequent effectual operation by any of the call push buttons is prevented.

The energization of the coil 141' closes the normally open contact members $a$ and opens the normally closed contact members $b$ of the relay 141. The closing of the contact members $a$ closes the energizing circuit for coil 217' of the clockwise direction relay 218'. This circuit is as follows: From supply conductor L1, through conductors 219, 220 and 221, contact members $b$ of one safety platform switch 39, conductor 222, door switch 223 (which is closed only when the door is completely closed), conductor 224, contact members $b$ of the other safety platform switch 39, conductors 225, 293, contact members $a$ of the relay 141, conductor 294, coil 217' of the relay 218', and conductors 228, 229 and 216 to supply conductor L2.

The energization of the relay coils 209 and 212 effects the automatic closing of the door 28 as previously described, and when it is completely closed, the switch 223, operated thereby, closes the circuit just previously traced to cause the normally open contact members $a$, $b$ and $c$ of the relay 218' to close the circuit from the three-phase alternating current supply conductors AC1, AC3 and AC2 to conductors 233, 234 and 235, respectively connected to the terminals of the driving motor 19. Thus, since two of the leads to the driving motor 19 have been interchanged, the motor rotates in a direction opposite to that which it does upon energization through the contact members of the counter-clockwise direction relay 218 and it will be seen that the rotation of the motor 19 in this latter case is such as to cause the circuitous elevator to move in a clockwise direction, which obviously is the proper direction for the shortest route between the position that cage 3 occupies as indicated in Fig. 1 and the lowermost position, which is the position it will occupy when it arrives at the loading and unloading station.

When the insulating segment 132' of the direction selector switch 127 engages the brush 3", the energizing circuit just traced is interrupted, which results in the deenergization of the driving motor relays 141 and 218' and of the door motor relays 210 and 213 resulting first in the stopping of cage 3 at the loading and unloading station and subsequently in the automatic opening of the door as previously described. It is now possible, as well as completely safe, for the driver of the automobile to walk into the hatchway space, enter his automobile and drive it out through the doorway 28'.

When the wheels of the automobile leave the treadle member 42 in the troughs 43, contact members $b$ of the switch 92 on the load-responsive device 41 close, as previously described, and the energizing circuit through the release coil 152 on the safety interlock 142 is thereby closed as follows: From supply conductor L1, through conductors 170, 181, 182 and 188, switch 151, conductor 189, coil 152, conductors 190, 300 and 301, contact members $b$ of switch 92, and conductors 302, 187, 176 and 177 to supply conductor L2. Thus the safety interlock is released and subsequent operation of the call push buttons or the token device is possible.

Our invention presupposes that the construction and operation of the direction selector switch 127 will be sufficiently accurate to ensure the substantial alignment of the trough-like members 43 on the cage with the platform at the loading and unloading station with no difference in levels therebetween so as to destroy the continuity of the path of travel for the wheels of the automobile.

However, the ensure the accurate leveling of the trough members 43 on each cage with the floor at the loading and unloading station, an additional leveling control may be added to our invention such as one which comprises limit switches mounted in the hatchway at the loading and unloading station, operable by a projecting cam on each cage to effect a movement of the circuitous elevator motor 19 to return the cage to a position of accurate alignment when it stops either above or below the proper level. Such a leveling control scheme is described in the copending application of F. E. Lewis, Serial No. 398,898, assigned to the Westinghouse Electric & Manufacturing Company.

The emergency stop push button switch ES is provided to effect an immediate stopping of the circuitous elevator at any time during its movement. It is located adjacent the doorway 28' near, or preferably on, the combination indicating lamp and call push-button panel 93 where it is readily operable by persons as are the call push buttons. As previously mentioned, its contact members $b$ and $c$ are included in the control circuit of the direction relays 140 and 141, respectively, so that the opening of these contact members deenergizes those relays to cause the immediate stopping of the motor 19, and, therefore, the circuitous elevator itself.

The normally open contact members $a$ of the emergency stop switch ES are in parallel with the contact members $b$ of the master load-responsive switch 92 from supply conductor L2 to the release coil 152 of the safety interlock 142. Therefore, the closing of the contact members $a$ causes the energization of the release coil 152. It will be understood that the opening of the control circuit through the direction relays 140 or 141 causes the deenergization of one of the call push button relays, for example, 13, which was energized when the circuitous elevator was moving, and, therefore, although the emergency stop switch ES is released and the contact members $b$ and $c$ reclosed, the circuitous elevator will not move because the control circuit is open. In order to again start the circuitous elevator moving, one of the call push buttons must be operated to again close the control circuit through one of the direction relays 140 or 141. However, in order to have the subsequent operation of a call push button effective, the safety interlock 142 must be released, and, therefore, the function of contact members $a$ of the emergency switch ES is to effect this release when the circuitous elevator is stopped.

Figure 2:
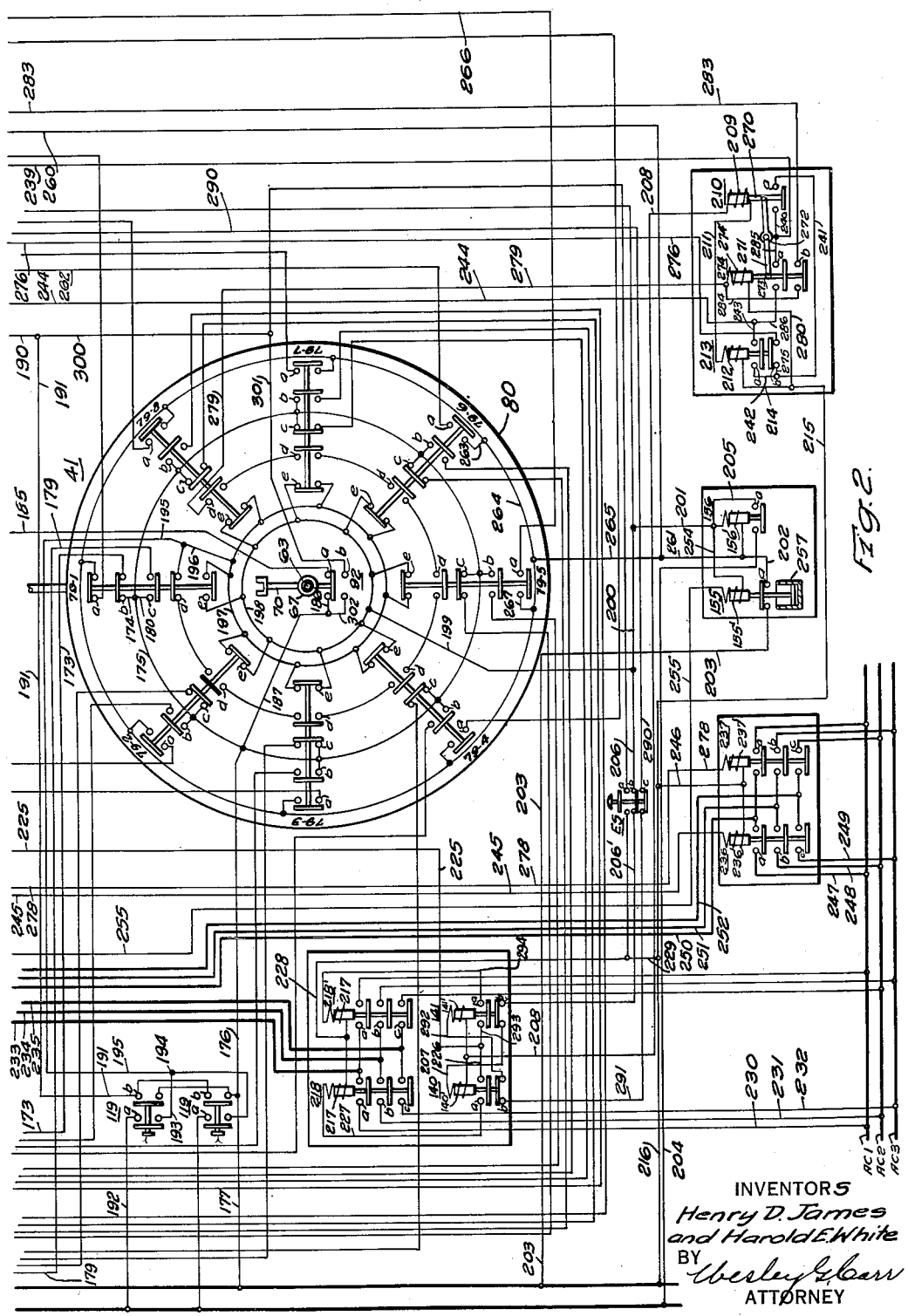
Figure 3:
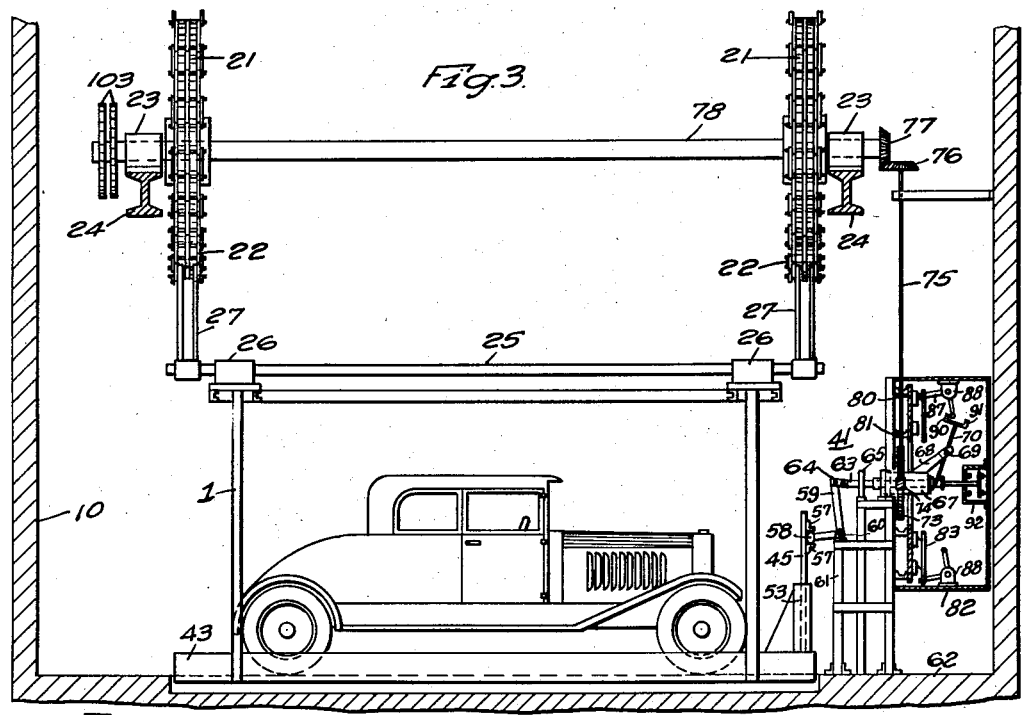
Fig. 3 is a view in side elevation of a cage in the lowermost position, that is, the loading and unloading position, showing also the overhanging-arm support for the cages, as well as the load-responsive means and its association with the cage and the drive of the circuitous elevator.

For convenience in securing a ready comprehension of the control system of our invention, we have illustrated, in Fig. 17, a schematic diagram illustrating the same connections as shown in the full line diagram shown in Figs. 1 and 2 as collectively used. The same designations for corresponding elements are used in both diagrams and, therefore, no further description of Fig. 17 will be given.

It will thus be seen that our invention provides a system of operation and control for a circuitous elevator which renders its operation automatic and independent of any special training for its operation and which embodies safety interlock features for the protection of the operator.

It will also be evident that our invention provides a means which is responsive to the loaded and unloaded condition of a cage for effecting various functions of control, that it provides a dispatch control system including a cage selector switch and associated relays for causing one or more cages to by-pass the loading and unloading station whether loaded or unloaded in order to balance the load on the elevator and effects the stopping of the next vacant cage after the expiration of the predetermined time necessary for one or more cages to pass the loading and unloading station, and that it provides a push button control system for calling a selected cage to the loading and unloading station by the shortest route.

Furthermore, it will be evident that our invention provides a device for securing a token or tag, constituting a memorandum of the number of the cage upon which a person has stored his automobile and provides that this token device must be operated before the circuitous elevator can be subsequently moved.

We are aware of the fact that our invention is capable of various modifications without a departure from the spirit thereof and we do not mean to limit ourselves to a particular structure which may be illustrated, except as defined in the following claims.

We claim as our invention:

1. In a circuitous elevator, the combination with a supporting structure, a plurality of load receptacles movable in an endless path successively past a loading station and motive means for moving the receptacles, of a control system for said motive means, including a circuit closing means for each receptacle and a direction selector switch means movable in correspondence with the movement of the receptacles cooperating with said circuit closing means to effect the movement of a selected receptacle by the shortest route to the loading station and to stop it thereat, and interlock means operable upon the effectual operation of any of the circuit closing means to render the subsequent operation of all of them ineffective.

2. In a circuitous elevator, the combination with a supporting structure, a plurality of load receptacles movable in an endless path successively past a loading station, and motive means for moving the receptacles, of a control system for said motive means including a plurality of circuit closing means, one for each receptacle and associated means including means operable thereby for effecting movement of said receptacle motive means, a safety interlock for rendering the operation of any of the circuit closing means ineffective after the effective operation of any one of them, said safety interlock comprising electromagnetically responsive means actuable upon the closing of any of said circuit closing means, means for retaining said electromagnetically responsive means in its actuated position, switch means connecting said circuit closing means and said electromagnetic means to a source of supply, and operable by said electromagnetically responsive means 'or interrupting their connection to the source of supply after said retaining means has become effective.

3. In a circuitous elevator, the combination with a supporting structure, a plurality of load receptacles movable in an endless path successively past a loading station and motive means for moving the receptacles, of a control system for said motive means including a plurality of circuit closing means one for each receptacle and associated means including electromagnetic means operable thereby to effect movement of said receptacle motive means, a safety interlock for rendering the operation of any of the circuit closing means ineffective after the effective operation of any one of them, said safety interlock comprising an electromagnetic means in series with all of said circuit closing means and energizable by the closing of any one thereof, movable magnetic means responsive to energization of said electromagnetic means, latch means for engaging said movable magnetic means and retaining it in the position to which it is moved when said electromagnetic means is energized, switch means connecting said circuit closing means and said electromagnetic means to a source of supply, and operable by said movable magnetic means for interrupting their connection to the source of supply, after said latch means has become effective.

4. In a circuitous elevator, the combination with a supporting structure, a plurality of load receptacles movable in an endless path successively past a loading station and motive means for moving the receptacles, of a control system for said motive means which includes a circuit closing means for each receptacle, a control circuit thereto, and associated means including means operable to effect movement of said motive means, interlock means operable upon the closing of any one of said circuit closing means to prevent the subsequent effectual operation of all of them and comprising a switch means in the control circuit to said circuit closing means actuable upon the operation of any one of the said circuit closing means to interrupt said control circuit, means for retaining said switch means in its interrupting position, and means for releasing said retaining means.

5. In a circuitous elevator the combination with a supporting structure, a plurality of load receptacles movable in an endless path successively past a loading station and motive means for moving the receptacles, of a control system for said motive means including a plurality of circuit closing means, one for each receptacle, and means associated therewith for effecting movement of said receptacle motive means, a safety interlock for rendering the subsequent operation of any one of the circuit closing means ineffectual, said safety interlock comprising an electromagnetic means in series with all of said circuit closing means and energizable by the closing of any one thereof, means for retaining said electromagnetic means in its energized position, switch means on said safety interlock in series with and operable by said electro-magnetic means to de-energize it after said retaining means has become effective and render the subsequent closing of any of the circuit closing means ineffective, and a second electro-magnetic means operable to render said retaining means ineffective and allow first mentioned electro-magnetic means to return to its deenergized position, a second switch means on said safety interlock in series with said second electro-magnetic means and operable by said first electro-magnetic means to render the second electro-magnetic means energizable only when the first is in its energized and retained position.

6. In a circuitous elevator, the combination with a supporting structure, a plurality of load receptacles movable in an endless path successively past a loading station and motive means for moving the receptacles of a means responsive to both the absence and presence of a load in said receptacles, comprising movable means on each receptacle, and means in said supporting structure engageable thereby for affecting the operation of said motive means.

7. In a circuitous elevator, the combination with a supporting structure, a plurality of load receptacles movable in an endless path successively past a loading station and motive means for moving the receptacles, of a means responsive to both the absence and presence of a load in said receptacles, comprising movable means on each receptacle responsive to the presence of a load therein, means in said supporting structure movable in correspondence with the movement of said receptacles and operably engaged by said movable means on each receptacle, switch means for each receptacle selectively operable by said means movable in correspondence with the movement of said receptacle, for affecting the operation of said motive means.

8. In a circuitous elevator, the combination with a supporting structure, a plurality of load receptacles movable in an endless path successively past a loading station and motive means for moving the receptacles, of a means responsive to both the absence and the presence of a load in said receptacles, and comprising movable means on each receptacle responsive to the presence of a load therein, means at said loading station movable in correspondence with the movement of said receptacles and operably engageable by the movable means of the receptacles individually, switch means for each receptacle disposed radially at regular angular intervals and engageable by said means movable in correspondence with the movement of the receptacles and selectively operable in response to the position of said movable means on each receptacle for affecting the operation of said motive means.

9. In a circuitous elevator, the combination with a supporting structure, a plurality of load receptacles movable in an endless path successively past a loading station and motive means for moving the receptacles, of a means responsive to both the absence and presence of a load in said receptacles, and comprising movable means on each receptacle responsive to the presence of a load therein, means at said loading station in said supporting structure movable in correspondence with the movement of said receptacles and operably engageable by the movable means of the receptacles individually to be moved to a first position in response to the absence of a load in said receptacles and to be moved to a second position in response to the presence of a load in said receptacles, switch means for each receptacle disposed radially at regular angular intervals and engageable by said means movable in correspondence with the movement of the receptacles and selectively operable thereby in response to the position of said movable means on the corresponding receptacle for affecting the operation of said motive means.

10. In a circuitous elevator, the combination with a supporting structure, a plurality of load receptacles movable in an endless path successively past a loading station and motive means for moving the receptacles, of a control system having a circuit closing means for each receptacle and associated means operable to effect the movement of said receptacle motive means, safety interlock means operable to prevent subsequent effective operation of said circuit closing means, and means responsive to the presence of a load in a receptacle for actuating said interlock means.

11. In a circuitous elevator, the combination with a supporting structure, a plurality of load receptacles movable in an endless path successively past a loading station and motive means for moving the receptacles, of a control system having a circuit closing means for each receptacle and associated means operable to effect the movement of said receptacle motive means, safety interlock means operable upon the closing of any one of said circuit closing means to render the subsequent operation of any of them ineffective until the release of said interlock means, and means responsive to the presence of a vacant receptacle at said loading station for releasing said safety interlock and for rendering the subsequent operation of the circuit closing means effective.

12. In a circuitous elevator, the combination with a supporting structure, a plurality of load receptacles movable in an endless path successively past a loading station and motive means for moving the receptacles, of a control system therefor including a circuit closing means for each receptacle, switch means movable in correspondence with the movement of the receptacles and associated with said circuit closing means for moving a selected receptacle to the said loading station by the shortest route and stopping it thereat, electromagnetic means for effecting the movement of the said receptacle moving means actuable by operation of said circuit closing means, and safety platform means operably responsive to the presence of a person in the path of movement of said receptacles for preventing actuation of said electromagnetic means to move said receptacles.

13. In a circuitous elevator, the combination with a supporting structure, a plurality of load receptacles movable in an endless path successively past a loading station and motive means for moving the receptacles, of a means for securing a memorandum check corresponding to the particular receptacle at the loading station and comprising a means movable in correspondence with the movement of the receptacles, retaining means for stacks of memorandum checks disposed thereon in a circle with regular angular distance therebetween, and means for engaging a check of only the stack corresponding to the receptacle at the loading station and ejecting it.

14. In a circuitous elevator, the combination with a supporting structure, a plurality of load receptacles movable in an endless path successively past a loading station and motive means for moving the receptacles, of a control system therefor comprising a means for simultaneously supplying a memorandum check corresponding to the particular receptacle at the loading station and effecting the movement of the said receptacle motive means.

15. In a circuitous elevator, the combination with a supporting structure, a plurality of load receptacles movable in an endless path successively past a loading station and motive means for moving the receptacles, of a control system therefor including a means for simultaneously supplying a memorandum check corresponding to the particular receptacle at the loading station and effecting the movement of the said receptacle motive means, said means comprising means movable in correspondence with the movement of the said receptacles, retaining means for stacks of memorandum checks disposed thereon in a circle with regular angular distance therebetween, means for engaging a check of only the stack corresponding to the receptacle at the loading station and ejecting it, and switch means operable by said check engaging means simultaneously with the ejectment of a memorandum check to effect the movement of said receptacle motive means.

16. In a circuitous elevator, the combination with a supporting structure, a plurality of load receptacles movable in an endless path successively past a loading station of the supporting structure and motive means for moving the receptacles, of a control system for said receptacle motive means, including call operating means, means associated therewith for controlling the movement of the said receptacle motive means, a door, means for opening and closing said door, control means for said door motive means operable upon operation of the said call operating means to cause said door motive means to close said door and operable upon the stopping of said receptacles to cause said door motive means to open said door.

17. In a circuitous elevator, the combination with a supporting structure, a plurality of load receptacles movable in an endless path successively past a loading station, and motive means for moving the receptacles, of a control system for said receptacle motive means which includes circuit closing means, electromagnetic switch means actuable thereby for controlling the movement of the said receptacle motive means, a door, motive means for opening and closing said door, electromagnetic switch means for controlling the movement of said door motive means and actuable upon the effective operation of any of the circuit closing means to cause said door motive means to close said door and operable to cause said door motive means to open said door when said receptacles stop.

18. In a circuitous elevator, the combination with a supporting structure, a plurality of load receptacles movable in an endless path successively past a loading station, and motive means for moving said receptacles, of a control system for said receptacle motive means including circuit closing means for each receptacle, electromagnetic switch means actuable upon the operation thereof for controlling the movement of said receptacle motive means, direction selector switch means movable in correspondence with the movement of the receptacles for causing said electromagnetic means to automatically effect movement of a selected receptacle to the loading station by the shortest route and for stopping it thereat, a door, motive means for opening and closing said door, electromagnetic switch means for controlling said door motive means operable upon the closing of any of the said circuit closing means to cause said door motive means to close said door and operable by said direction selector switch upon the stopping of a receptacle at the loading station to cause said door motive means to automatically open said door.

19. In a circuitous elevator, the combination with a supporting structure, a plurality of load receptacles movable in an endless path successively past a loading station and motive means for moving said receptacles, of a control system for said receptacle motive means which includes circuit closing means for each receptacle, electromagnetic switch means operable thereby to control the movement of said receptacle motive means, a door, a motive means for opening and closing said door, electromagnetic switch means for controlling the movement of said door motive means and actuable upon the operation of any of the said circuit closing means to cause said door motive means to close said door and operable when the receptacles stop moving to cause said door motive means to open said door, limit switch means operable by said door to stop said door motive means when said door is completely closed, and a limit switch means operable by said door to stop said door motive means when said door is completely open.

20. In a circuitous elevator, the combination with a supporting structure, a plurality of load receptacles movable in an endless path successively past a loading station and motive means for moving said receptacles, of a control system for said motive means which includes circuit closing means for each receptacle, electromagnetic switch means operable thereby for controlling the movement of said receptacle motive means in either of two opposite directions, direction selector switch means movable in correspondence with the movement of said receptacles for automatically effecting the actuation of said electromagnetic switch means to cause a selected receptacle to move to the said loading station by the shortest route and stop thereat, a door, interlock means operable by said door for preventing the said electromagnetic switch means from becoming effective until the said door is completely closed.

21. In a circuitous elevator, the combination with a supporting structure, a plurality of load receptacles movable in an endless path successively past a loading station and motive means for moving said receptacles, of a control system for said receptacle motive means including a circuit closing means for each receptacle and electromagnetic switch means operable by any one thereof for controlling the movement of the said receptacle motive means in either of two opposite directions, a door, means for opening and closing said door, interlock means operable by said door to prevent said electromagnetic switch means from becoming effective until said door is closed, a safety platform adjacent the path of said receptacles, and interlock means operable thereby when a load is disposed on said platform to prevent the closing of said door until said load is removed.

22. In a circuitous elevator, the combination with a supporting structure, a plurality of load receptacles movable in an endless path successively past a loading station, and motive means for moving the receptacles, of a control system for said receptacle motive means, including a direction selector means movable in correspondence with the movement of the receptacles and call operating means for each receptacle cooperating therewith whereby a selected receptacle is automatically moved to the loading station by the shortest route and stopped thereat.

23. In a circuitous elevator, the combination with a supporting structure, a plurality of load receptacles movable in an endless path successively past a loading station, and motive means for moving the receptacles, of a control system for said receptacle motive means, including a direction selector switch means movable in correspondence with the movement of the receptacles and circuit closing means for each receptacle cooperating therewith whereby a selected receptacle is automatically moved to the loading station by the shortest route and stopped thereat.

24. In a circuitous elevator, the combination with a supporting structure, a plurality of load receptacles movable in an endless path successively past a loading station, and motive means for moving the receptacles, of a control system for said receptacle motive means including electromagnetic means for controlling the energization of said receptacle motive means for one direction of movement thereof and electromagnetic means for effecting an opposite direction of movement of said receptacle motive means, a circuit closing means for each receptacle, a direction selector switch means movable in correspondence with the movement of the receptacles, each of said circuit closing means being connected through said selector switch means to said electromagnetic means, said selector switch means by its physical position automatically determining which electromagnetic means is energized upon the closure of any circuit closing means to actuate said receptacle motive means to move a selected receptacle to the loading station by the shortest route and automatically effecting the stopping thereof at the loading station.

25. In a circuitous elevator, the combination with a supporting structure, a plurality of load receptacles movable in an endless path successively past a loading station of the supporting structure and motive means for moving the receptacles, of a control system for said receptacle motive means, including a circuit closing means, switch means actuable thereby to cause said motive means to move said receptacles, and receptacle selector means movable in correspondence with the movement of the receptacles for maintaining the switch means in an actuated condition until a vacant receptacle reaches the loading station and for causing it to effect the stopping of that receptacle thereat.

26. In a circuitous elevator, the combination with a supporting structure, a plurality of load receptacles movable in an endless path successively past a loading station of the supporting structure and motive means for moving the receptacles, of a control system for said receptacle motive means, including a circuit closing means, switch means actuable thereby to cause said motive means to move said receptacles, and receptacle selector means comprising means movable in correspondence with the movement of the cages and time delay switch means for maintaining the said switch means in an actuated condition for a predetermined length of time and causing it to effect the stopping of the next vacant receptacle to reach the loading station thereat after the expiration of the predetermined time.

27. In a circuitous elevator, the combination with a supporting structure, a plurality of load receptacles movable in an endless path successively past a loading station, motive means for moving the receptacles, and a door, of a control system for said receptacle motive means, including a circuit closing means, electromagnetic switch means actuable thereby to cause said motive means to move said receptacles, and receptacle selector means including means movable in correspondence with the movement of the receptacles and time delay switch means for maintaining the continued actuation of said electromagnetic switch means for a predetermined length of time after the closing of said door and for causing it to effect the stopping of the next vacant receptacle to reach station thereat after the expiration of the predetermined time.

28. In a circuitous elevator, the combination with a supporting structure, a plurality of load receptacles movable in an endless path successively past a loading station and motive means for moving the receptacles, of a control system for said receptacle motive means including a circuit closing means, electromagnetic switch means actuable thereby for controlling the movement of said receptacle motive means, means responsive to the presence of a load in each receptacle for rendering said electromagnetic switch ineffective when all the receptacles contain a load.

29. In a circuitous elevator, the combination with a supporting structure, a plurality of load receptacles movable in an endless path successively past a loading station, a door at said loading station, and motive means for opening and closing said door, of means responsive to the presence of a load in each of the receptacles for causing said door motive means to close said door when all the receptacles contain a load.

30. In a circuitous elevator, the combination with a supporting structure, a plurality of load receptacles movable in an endless path successively past a loading station, a door at said loading station, and motive means for opening and closing said door, of a control system for said door motive means including a circuit closing means, an electromagnetic switch means actuable by the operation of the said circuit closing means for controlling the movement of said door motive means, and means responsive to the presence of a load in each of the receptacles for rendering said electromagnetic switch means effective to close said door when all the receptacles contain a load.

31. In a circuitous elevator, the combination with a supporting structure, a plurality of load receptacles movable in an endless path successively past a loading station motive means for moving the receptacles, a door, and motive means for opening and closing said door, of means responsive to the presence of a load in all the receptacles for preventing the movement of said receptacle motive means and rendering said door motive means effective to close said door.

32. In a circuitous elevator, the combination with a supporting structure, a plurality of load receptacles movable in an endless path successively past a loading station motive means for moving the receptacles, a door, motive means for opening and closing said door, of a control system for said receptacle motive means and said door motive means including a circuit closing means, electromagnetic switch means for controlling the movement of said receptacle motive means, a second electromagnetic switch means for controlling the movement of said door motive means, both of said electromagnetic switch means actuable upon the operation of any of said circuit closing means, and means responsive to the presence of a load in each of the receptacles for rendering said first electromagnetic switch means ineffective and rendering said second electromagnetic switch means effective upon the closing of said circuit closing means when all the receptacles contain a load.

33. In a control system for a circuitous elevator having a plurality of load receptacles movable in an endless path successively past a loading station, motive means for moving the receptacles and control means for the motive means comprising a plurality of switches associated respectively with said receptacles, means responsive to operation of any of said switches for causing said motive means to move the associated receptacle to the loading station, and interlocking means to render the remainder of said switches ineffective after said any of said switches has been operated.

34. In a control system for a circuitous elevator having a plurality of load receptacles movable in an endless path successively past a loading station, motive means for moving the receptacles and control means for the motive means comprising a plurality of switches associated respectively with said receptacles, means responsive to operation of any of said switches for causing said motive means to move the associated receptacle to the loading station, and interlocking means responsive to operation of said any of said switches for rendering the remainder of said switches ineffective.

35. In a control system for a circuitous elevator having a plurality of load receptacles movable in an endless path successively past a loading station, motive means for moving the receptacles and control means for the motive means comprising a plurality of switches associated respectively with said receptacles, means responsive to operation of any of said switches for causing said motive means to move the associated receptacle to the loading station, interlocking means to render the remainder of said switches ineffective during movement of said elevator in response to said any of said switches, and means to render said interlocking means ineffective upon the arrival at the loading station of the receptacle associated with said any of said switches.

36. In a control system for a circuitous elevator having a plurality of load receptacles movable in an endless path successively past a loading station, motive means for said elevator, and means including an element on each receptacle responsive to a loaded condition thereof for causing the starting of said motive means.

37. In a control system for a circuitous elevator having a plurality of load receptacles movable in an endless path successively past a loading station, a door at said loading station, mechanism for opening and closing said door, a safety-platform adjacent said elevator, and means responsive to the presence of a load on said platform for preventing operation of said door by said mechanism.

38. In a control system for a circuitous elevator having a plurality of load receptacles movable in an endless path successively past a loading station, motive means for said elevator, starting means to cause said motive means to move a vacant receptacle to said loading station, and means responsive to a loaded condition of all of said receptacles for rendering said starting means ineffective.

HENRY D. JAMES.
HAROLD E. WHITE.